United States Patent [19]

Firey

[11] 4,412,511

[45] Nov. 1, 1983

[54] CHAR AND OIL BURNING ENGINE

[76] Inventor: Joseph C. Firey, P.O. Box 15514, Seattle, Wash. 98115

[21] Appl. No.: 367,019

[22] Filed: Apr. 9, 1982

Related U.S. Application Data

[63] Continuation-in-part of Ser. No. 183,182, Sep. 2, 1980, abandoned.

[51] Int. Cl.³ .................. F02B 45/02; F02D 19/04
[52] U.S. Cl. .............................. 123/23; 123/557; 123/576
[58] Field of Search .............. 123/23, 24, 575, 576, 123/557

[56] References Cited

U.S. PATENT DOCUMENTS 974,087  10/1910  Low ..................................... 123/23
2,396,524  3/1946  Nettel ................................... 123/23
2,625,141  1/1953  Berlyn .................................. 123/23
3,981,277  9/1976  Abom ................................... 123/23
4,059,078  11/1977  de la Rosa ....................... 123/25 K
4,204,506  5/1980  Bowling .............................. 123/23

FOREIGN PATENT DOCUMENTS 11475  of 1846  United Kingdom ................. 123/24

Primary Examiner—William A. Cuchlinski, Jr.

[57] ABSTRACT

An internal combustion engine is described capable of burning porous solid char fuels alone or with oil fuels. Air is forced into the char pore spaces during the compression process of the engine cycle in order to achieve the rapid burning needed for reasonable engine speeds. Fresh char fuel is periodically furnished into a combustion chamber and ashes are removed therefrom. Engine torque is controlled by control of intake air density.

44 Claims, 25 Drawing Figures

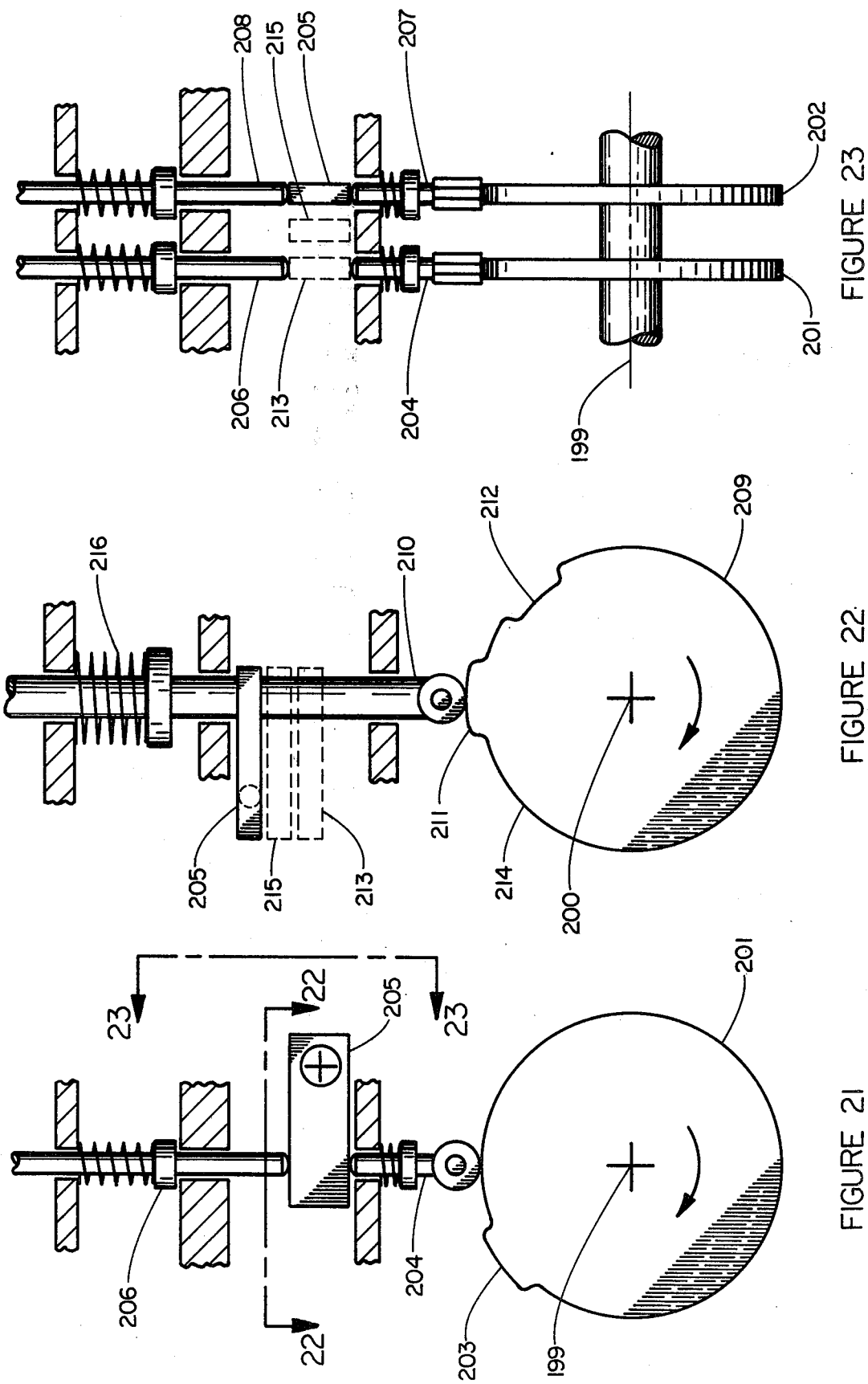

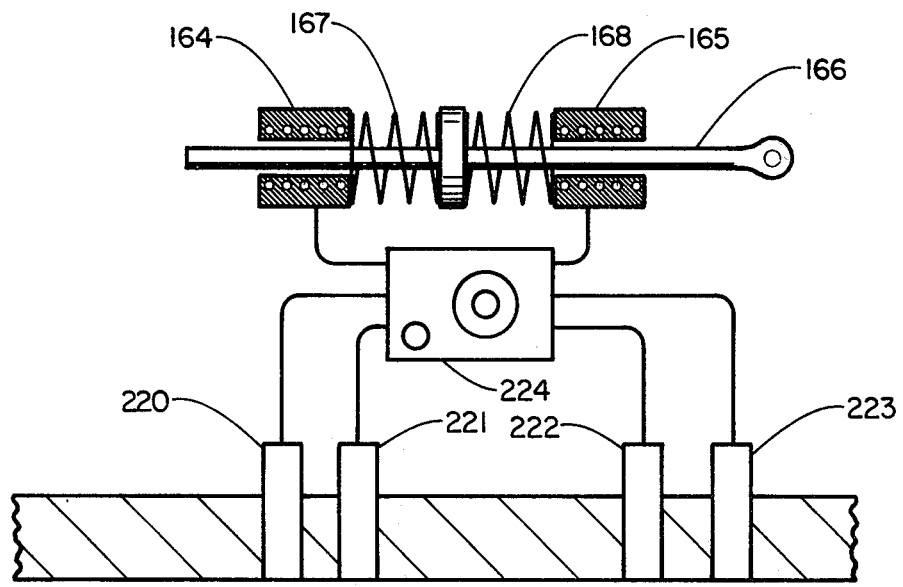
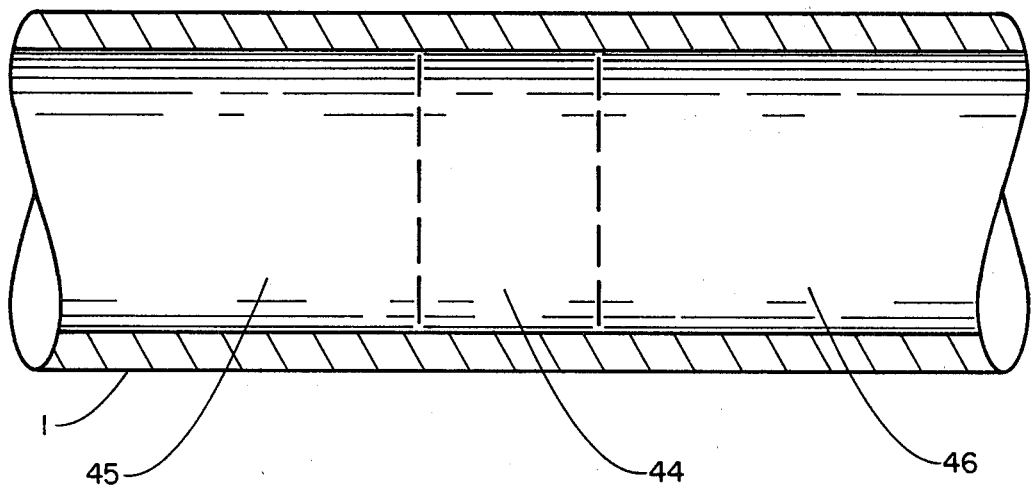
FIGURE 24

CHAR AND OIL BURNING ENGINE

CROSS REFERENCES TO RELATED APPLICATIONS

This application is a continuation-in-part of my earlier filed patent application entitled, "Improved Char and Oil Burning Engine," Ser. No. 06/183,182, filing date Sept. 2, 1980 now abandoned, Joseph Carl Firey inventor, Group Art Unit 342. This patent application differs from the above cross referenced related application principally by also including; the use of radioactive ash radiation for ash level sensing, the use of oxygen enrichment particularly for unit process engines, the use of steam stratification and steam admission during compression, and the removal of partially burned coke as a by-product from the engine. The above cross referenced related application is, in turn, a continuation-in-part of my still earlier filed patent application entitled, "Char and Oil Burning Engine," Ser. No. 06/083607, filing date Oct. 11, 1979 now abandoned, which latter is in its turn a continuation-in-part of my yet earlier filed patent application entitled, "Char Burning Engine," Ser. No. 06/042447, filing date May 25, 1979 now abandoned. This application is also related to my patent applications listed below:
a. "Porous Burner Diesel Engine," Ser. No. 06/138988, filed Apr. 10, 1980, now abandoned.
b. "Engine Steam Stratifier," Ser. No. 06/148401, filed May 9, 1980, now issued as U.S. Pat. No. 4,333,423.
c. "Cyclic Char Gasifier," Ser. No. 06/121,973, filed Feb. 15, 1980.
d. "Improved Cyclic Char Gasifier," Ser. No. 06/328,148, filed Dec. 7, 1981.
e. "Cyclic Catalytic Reactor," Ser. No. 06/214443, filed Dec. 8, 1980.
f. "Char Burning Free Piston Gas Generator," Ser. No. 06/264105, filed May 14, 1981, now issued as U.S. Pat. No. 4,372,256.
g. "Improved Porous Burner Diesel Engine," Ser. No. 06/416455, filed Sept. 9, 1982, now allowed but not yet issued.
h. "Cyclic Solid Gas Reactor," Ser. No. 06/473566, filed Mar. 9, 1983.

BACKGROUND OF THE INVENTION

1. Field of the Invention

This invention is in the field of internal combustion engines and particularly the field of internal combustion engines burning solid fuels alone or in combination with liquid or gaseous fuels.

2. Description of the Prior Art

Efforts have been made in the past to burn solid fuels, in pulverized form, in internal combustion engines, either alone or in combination with liquid or gaseous fuels (see reference G and references 1, 2 and 3 therein). When run with diesel fuel pulverized coal could be burned at least partially in an internal combustion engine (see references H and K). None of these prior art efforts produced an engine commercially successful for a long time period and all present-day internal combustion engines in common use burn gaseous and/or liquid fuels only.

Certain mechanical portions of the internal combustion engines of my invention are already well known in the prior art such as the pistons, cylinders, crankshafts, etc. The term "internal combustion engine" is used hereinafter and in the claims to mean these already well known combinations of cylinders, cylinder heads, pistons operative within said cylinders and connected to a crankshaft via connecting rods, valves and valve actuating means or cylinder ports, cams and camshafts, lubrication system, cooling system, ignition system if needed, flywheels, starting system, fuel supply system, fuel air mixing system, intake pipes and exhaust pipes, superchargers, torque control system, etc. as necessary or desired for the operation of said internal combustion engine. The term "internal combustion" is used hereinafter and in the claims to include also the already well-known combinations as described above but wherein the cylinders, cylinder heads, pistons operative within said cylinders and connected to a crankshaft via connecting rods, valves and valve actuating means or cylinder ports, are replaced by a rotary engine mechanism combination, comprising a housing with a cavity therein, and plates to enclose the cavity, a rotor operative within said cavity and sealing off separate compartments within said cavity and connecting directly or by gears to an output shaft, ports in said housing for intake and exhaust, such as in the "Wankel" type engine. An internal combustion engine may be of the four stroke type, wherein for each cylinder two full engine revolutions or processes are required to complete a single engine cycle of intake, compression, combustion, expansion and exhaust, or alternatively may be of the two stroke type wherein a single engine cycle is completed for each cylinder, within a single engine revolution or process, as is well known in the art of internal combustion engines.

The term "internal combustion engine mechanism" is used herein and in the claims to mean all those portions of an internal combustion engine, as defined hereinabove, except the fuel supply system, fuel-air mixing system, torque control system and any spark ignition apparatus. The term, "piston and cylinder," is used herein and in the claims to mean these elements of an internal combustion engine as commonly used in piston and cylinder engines, and also the functionally corresponding elements as used in other engine types such as the Wankel engine, and further includes cases where more than one piston is used in each cylinder.

The term "char fuels" is used hereinafter and in the claims to mean any fuel, capable of reacting chemically with oxygen to release chemical energy, whose usual physical state is wholly or largely solid or which leaves behind a solid residue after volatile matter has been evolved. Included within this definition of char fuel are such common and well known fuels as coal, coke, charcoal, coal char, petroleum char, wood, lignite, peat, petroleum coke, certain residual petroleum fuels, etc. Certain of these fuels, such as wood and certain types of coal, are known to evolve gaseous and liquid fuel components when heated and these evolved gaseous and liquid fuel components are hereinafter referred to as "volatile matter." All of the above defined char fuels are either already solid or leave behind a solid, largely carbonaceous, residue hereinafter referred to as "fixed carbon." Many of the above defined char fuels are also known to contain ash-forming ingredients which leave behind a non-burnable residue after the fuel has been burned with oxygen and this non-burnable residue is hereinafter and in the claims referred to as the "ash."

The inability of prior art internal combustion engines to readily burn char fuels is a deficiency of these engines. In the past this deficiency of prior art internal conbustion engines has been significant in only certain applications, such as in railroad engines, since gaseous and liquid fuels have been in plentiful supply heretofore. Now, however, the rapidly increasing use of internal combustion engines combined with the increasing cost and difficulty of finding new sources of liquid and gaseous fuels has made this deficiency of prior art internal combustion engines a significant problem in many more applications. Presently known reserves of solid fuels, particularly coal, are, on the other hand, many-fold greater than known reserves of petroleum and natural gas. It will clearly be a great public benefit if these readily available char fuels can be used in the highly efficient and convenient internal combustion engine. That this is so is amply demonstrated by the large amounts of public and private research money and effort being now expended in an effort to discover satisfactory ways to liquify coal in order to make it useable in prior art internal combustion engines.

The ease of handling and refueling with liquid fuels combined with their usually high energy density make them preferred fuels for passenger cars and especially for aircraft. Hence, we desire to make as much as the coal into a liquid fuel as is economically and conveniently possible. Several processes are already well known in the art for the devolatilization of coal whereby the volatile matter of the coal is largely removed and converted into valuable liquid and gaseous fuels. Most of these processes are of low cost and use up only a lesser portion of the chemical energy of the coal. The thusly devolatilized coal leaves behind a coal char material, constituting perhaps 40 to 75 percent of the original coal, which is usually very porous, essentially all solid material and highly carbonaceous. Efforts to liquify or gasify this solid coal char material have proven disappointing in that the necessary processing is costly, consumes significant portions of the available chemical energy of the coal char, and yields fuel products possessing unsatisfactory characteristics.

Solid char fuels of high porosity and similar to the above-described coal char fuel can also be manufactured by the devolatilization of wood waste materials, tree bark, agricultural waste materials, garbage, and other vegetable and organic materials. Most of these vegetable-derived fuels are a renewable energy resource.

SUMMARY OF THE INVENTION

The char burning engines of this invention can burn char fuels in solid form or other char fuels containing volatile matter provided these solid fuels are porous or become porous when the volatile matter is distilled off. These char burning engines comprise, an internal combustion engine mechanism as described heretofore, fitted with a char burning combustion chamber, means to refuel said combustion chamber, means to remove ashes from said combustion chamber, and means of controlling said refueling and ash removal processes so that an adequate quantity of char fuel is inside the combustion chamber during engine running. The char fuel is contained within a porous or ported combustion chamber made of ceramic or other high temperature material. During the compression stroke, the engine piston forces air through the ports or pores of the combustion chamber and into the pore space within the char fuel. In this way the char fuel comes into intimate contact with the oxygen in the air and rapid oxidation of the char to carbon monoxide and/or carbon dioxide occurs readily within the char pores provided the temperature of the char is sufficiently high. Since within the pores carbon is present in great excess over the oxygen, the predominant oxidation product within the pores is carbon monoxide, any carbon dioxide formed tending to be reduced to carbon monoxide by the carbon of the pore surfaces. During the engine expansion stroke the gaseous oxidation products now flow out of the char pore space and into the volume of the engine cylinder. If extra air and oxygen are available in the cylinder volume outside the char pore space, carbon monoxide can be burned to carbon dioxide by this extra oxygen. We thus see that two principal forms of this engine, as well as combinations of these two forms, can be constructed: a carbon monoxide generating engine wherein almost all of the air and oxygen are compressed into the char pore space to react principally to carbon monoxide; and a carbon dioxide generating engine wherein no more than half of the air and oxygen are compressed into the char pore space, the remaining oxygen being held outside to subsequently burn the emerging carbon monoxide to carbon dioxide. For a given engine size, speed, cycle and compression ratio, the power output of the carbon dioxide generating engine will usually be greater than that of the carbon monoxide generating engine. Where the char burning engine is the only power generator the carbon dioxide generating engine is preferred and this is a dual process engine. Char burning engines can also be used wherein a gas turbine engine is driven by the char burning engine exhaust gas and in this case the carbon monoxide generating engine, a unit process engine, may be preferred with the carbon monoxide being burned to carbon dioxide after the char burning engine but within the combustion chamber of the gas turbine engine. In this way, use of a unit process engine of this invention provides a method for burning coal in gas turbine-steam turbine cycle power plants, which heretofore have used only oil or gas as fuel due to blade problems in the gas turbine when coal is used. Dual process engine exhaust can also be used to drive gas turbine engines and the gas turbine inlet temperature can be controlled by controlling the extent to which carbon monoxide from the char pores is burned to carbon dioxide within the char burning engine. This latter engine is then an adjustable dual process engine.

Control of engine torque and power output is preferably done by controlling the amount of air placed in the engine cylinder during the air intake process, and this is most easily done by controlling the intake air density via control of the manifold absolute pressure, MAP. The MAP can be thusly controlled either with an air intake throttle or with an adjustable intake supercharger or with a combination of intake throttle and adjustable supercharger. With this MAP control of engine torque, the char fuel quantity within the combustion chamber is preferably greater then needed to burn with the oxygen available in a single engine cycle. In this way the available oxygen can be very nearly completely utilized if desired. Of course, as the engine runs on, the char is being burned up, and hence, at intervals, new char fuel must be refueled into the combustion chamber to replace that which has burned up.

The engine can be started by heating up the char fuel sufficiently to react rapidly with the oxygen in the air and this can be done in several ways, as by simple cranking or by starting the engine as a diesel engine and then the hot oxygen containing diesel combustion products will heat up the char and commence the char burning.

A preferred way to stop the engine is to recirculate engine exhaust gas, which is essentially oxygen free, into the engine intake and the char stops burning in the absence of oxygen. Addition of excess steam can also be used to stop the engine.

A principal beneficial object of this invention is to make available an internal combustion engine capable of efficiently burning solid carbonaceous fuels alone or in combination with other fuels both liquid and gaseous. Known fuel reserves of such solid fuels are far larger than of liquid or gaseous fuels. Additionally, solid carbonaceous fuels can be prepared from renewable vegetable matter sources.

REFERENCES:
A. Matsui, Koyama, Ushara, "Combustion And Flame," Vol. 25, No. 1, August 1975.
B. B. S. Beshty, "Combustion And Flame," Vol. 32, No. 3, July 1978.
C. "Elements of Mechanism," by Schwamb, Merrill and James, fourth edition, Wiley, 1930.
D. "Steam," Babcock and Wilcox Co., 38th Edition, 1972.
E. "Boundary Layer Combustion of Carbon," Adomeit, Mohiuddin and Peters, Sixteenth Symposium (International) On Combustion, pg. 731, 1976.
F. "The Ignition of Carbon and Its Catalysis by Platinum," L'Homme and Boudart, Eleventh Symposium (International) On Combustion, pg. 197, 1967.
G. "Combustion in a Coal Fired Internal Combustion Engine: A Simple Theory," Sacton, Creswick and Kircher, ASME Paper No. 78, WA/FU-1, 1978.
H. "Performance of a Diesel Engine Operating on Raw Coal-Diesel Fuel Slurries," Marshall, Bhat, Mulvaney, Sevelli, SAE Paper 810253, 1981.
I. U.S. Pat. No. 2,625,141.
J. U.S. Pat. No. 4,059,078.
K. "Solid Fuel Applications to Transportation Engines," Rentz, Timbario, and Renner, SAE Paper 810445, 1981.

Figure 4:
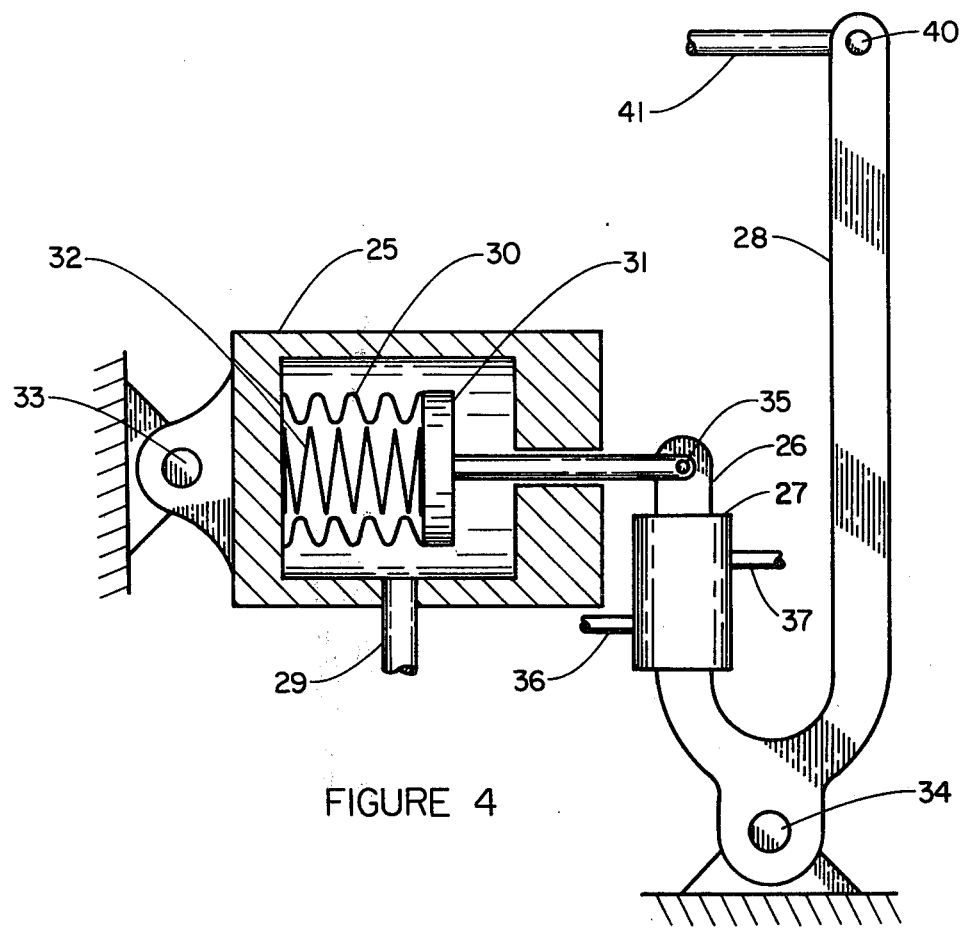
Figure 5:
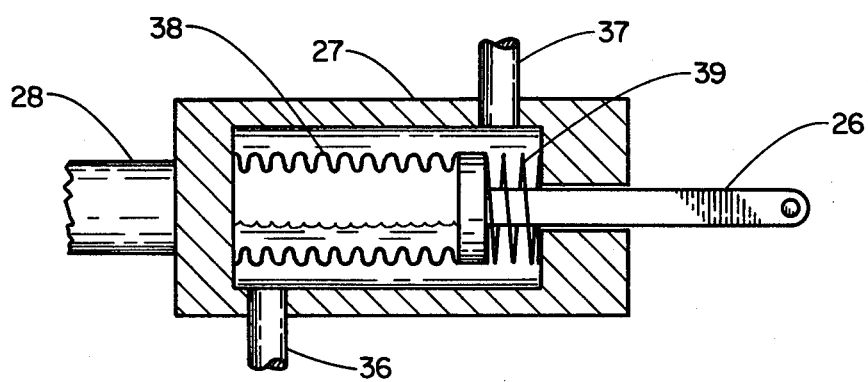

One scheme for controlling the amount of char fuel being refueled in proportion to engine intake air density is shown in FIGS. 4 and 5. One element, 30, responds to intake air pressure and another element, 27, responds to intake air temperature and these two responses are combined, via the linkwork, to respond at the lever end, 40, in proportion to intake air density. This intake air density response then acts, as via the reload mechanism, to control the char fuel quantity being refueled.

Figure 6:
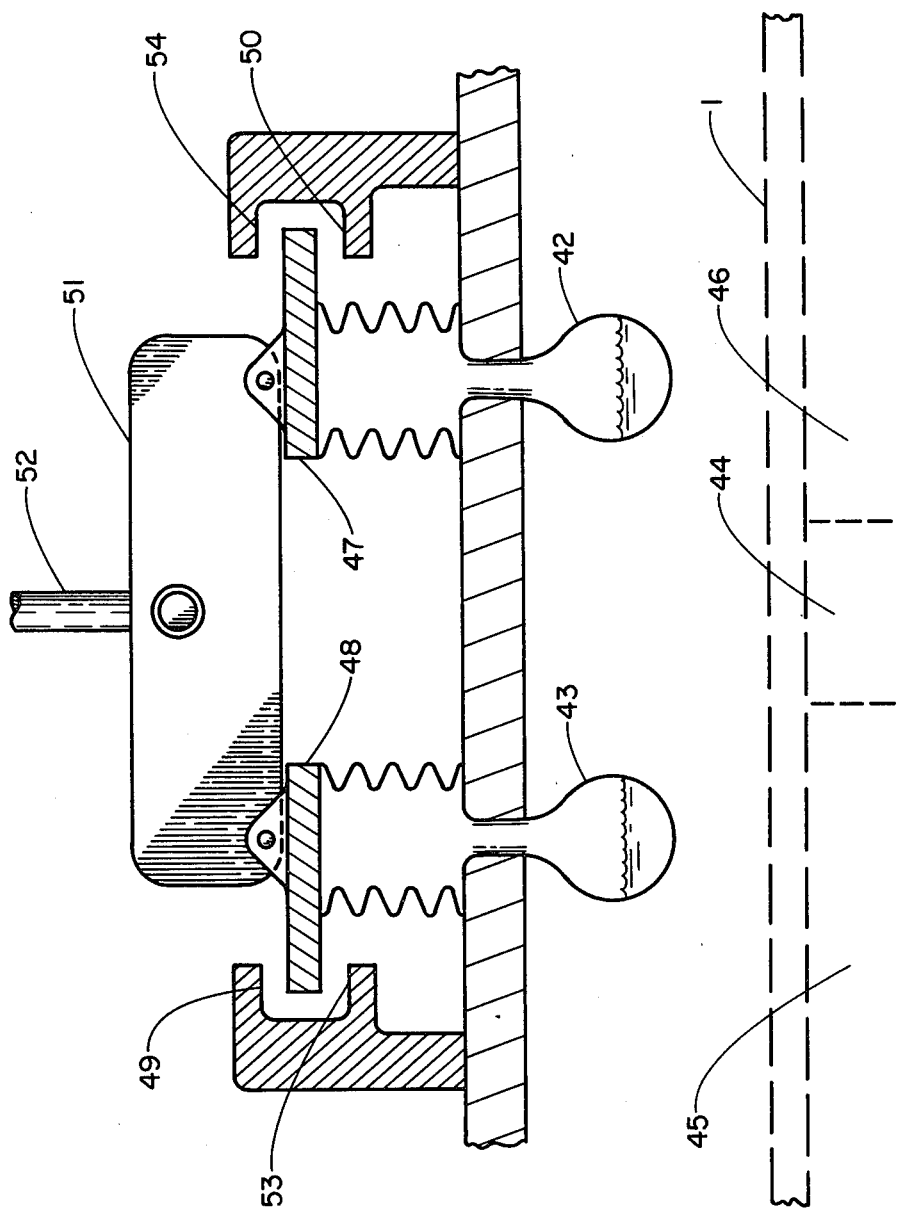

Another scheme for controlling the refuel quantity is shown in FIG. 6, wherein temperature sensing elements, 42 and 43, act via the linkage, 52, to maintain the ash zone, 44, at an approximately fixed position in the combustion chamber, 1.

Figure 7:
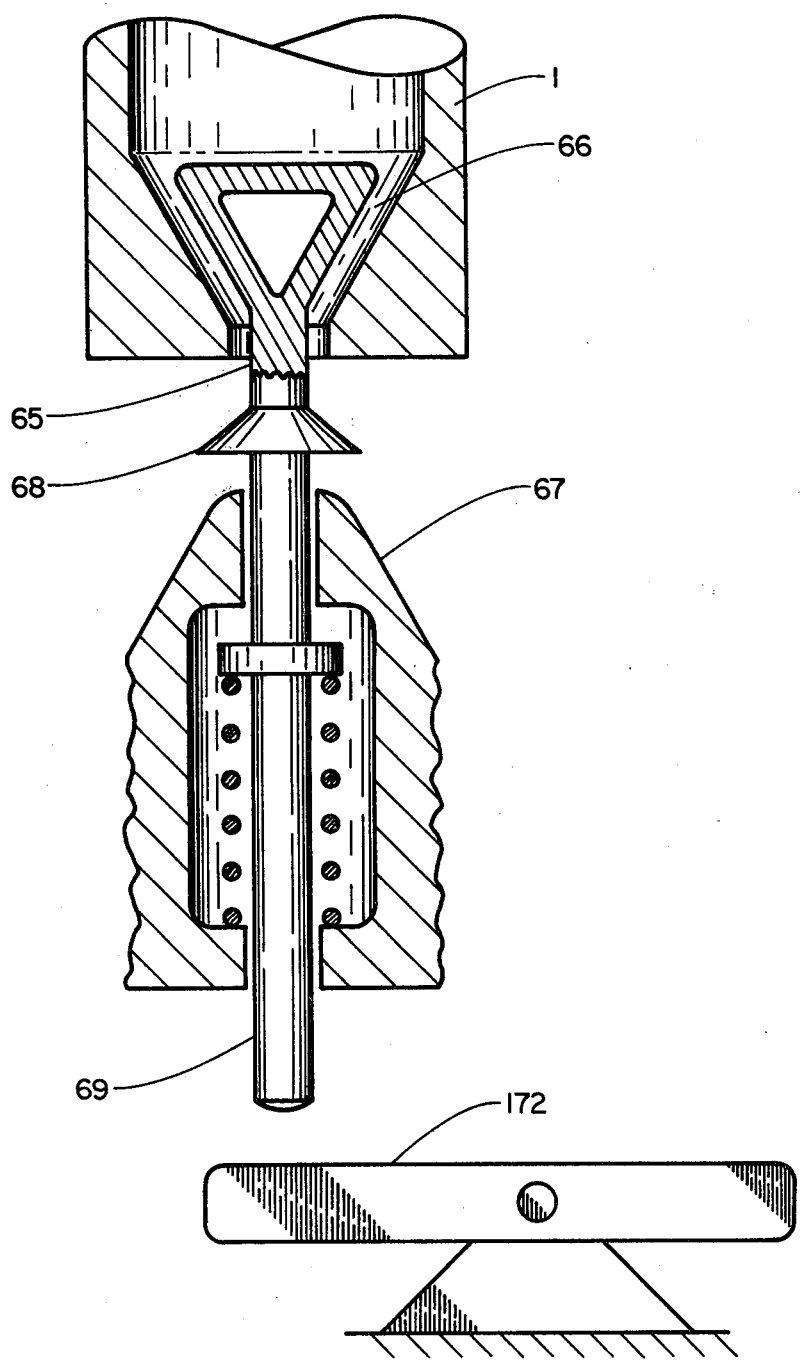

An ash valve method for removing molten ashes from the combustion chamber, 1, is shown in FIG. 7.

Figure 8:
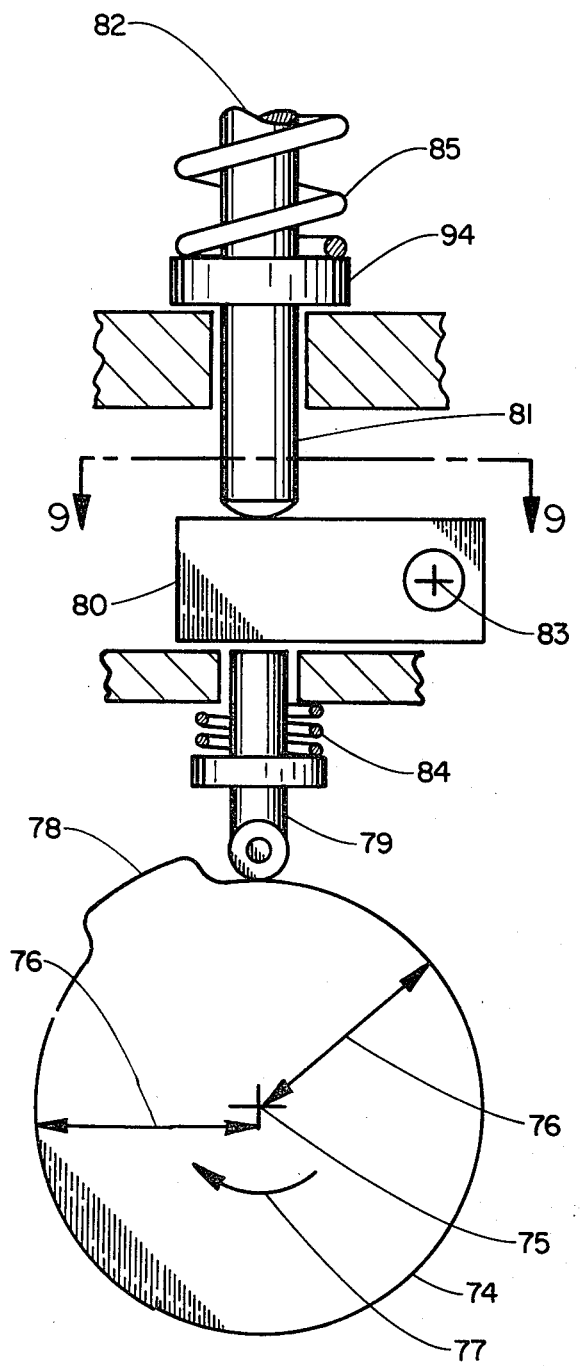
Figure 9:
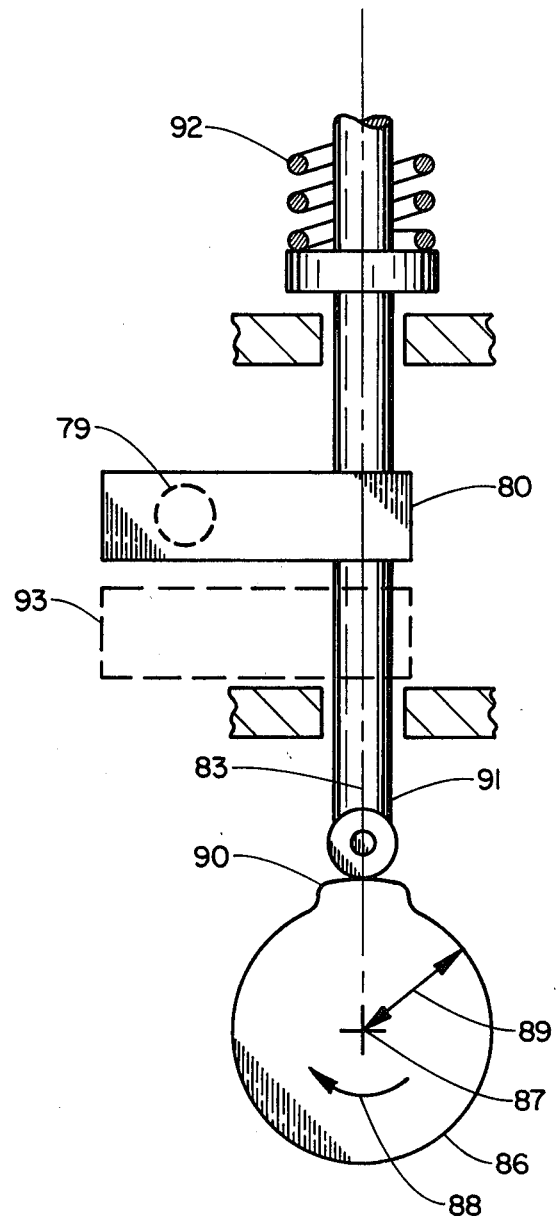

An example of a dual speed drive means suitable for driving the refuel mechanism, or the ash removal mechanism is shown in FIG. 8 with a cross section view in FIG. 9 and comprises a refuel drive cam, 74, with multiple cam followers, 79, 80, and 81 and a refuel interval cam, 86, which latter engages and disengages the moveable refuel drive cam follower, 80.

Figure 10:
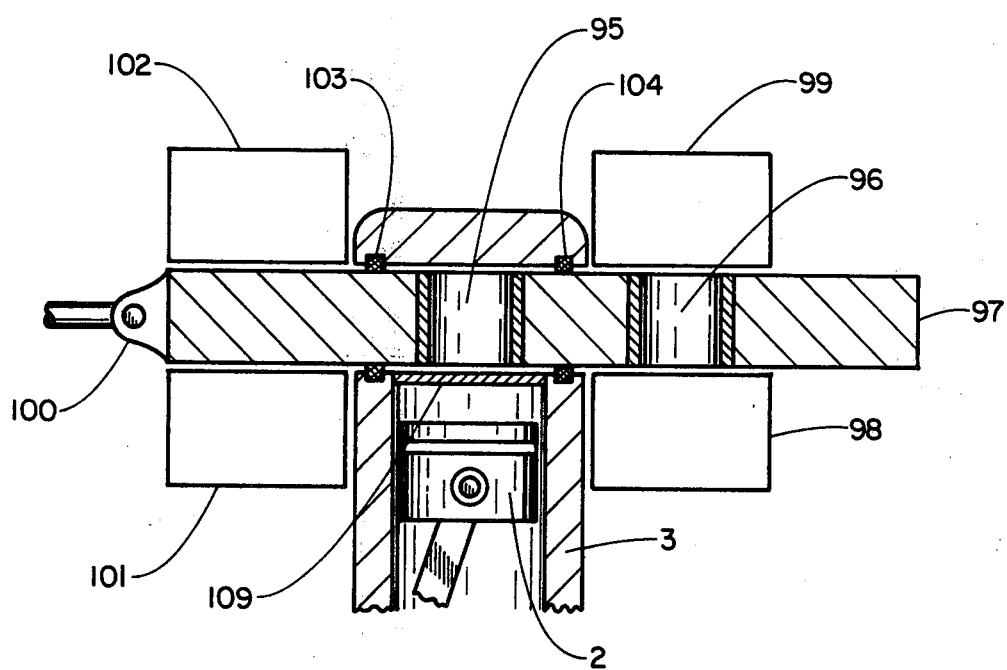

An example of a moveable combustion chamber arrangement is shown in FIG. 10 comprising two combustion chambers, 95 and 96, with the chamber, 95, inside the engine cylinder, 3, and with the chamber, 96, outside the engine cylinder and in position for refueling and ash removal.

Figure 11:
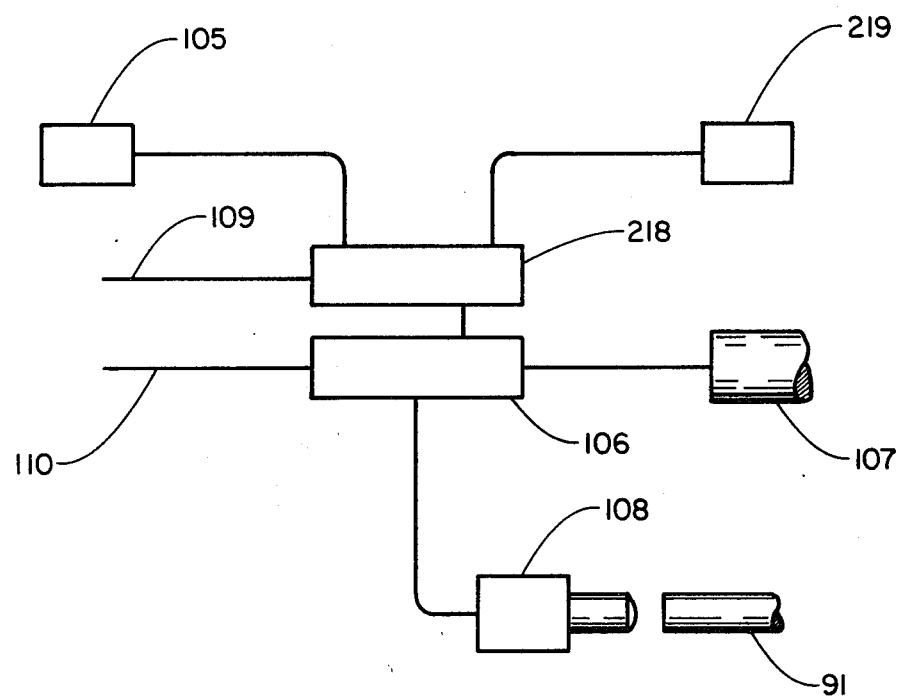

A schematic diagram of one form of electrical refuel interval control scheme is shown in FIG. 11 wherein outputs of an intake air density sensor, 105, and an ash level sensor, 104, are combined in a control device 103, to set the refuel interval of engine revolutions via the solenoid actuator, 108, acting upon a portion, 91, of the refuel drive means.

Figure 12:
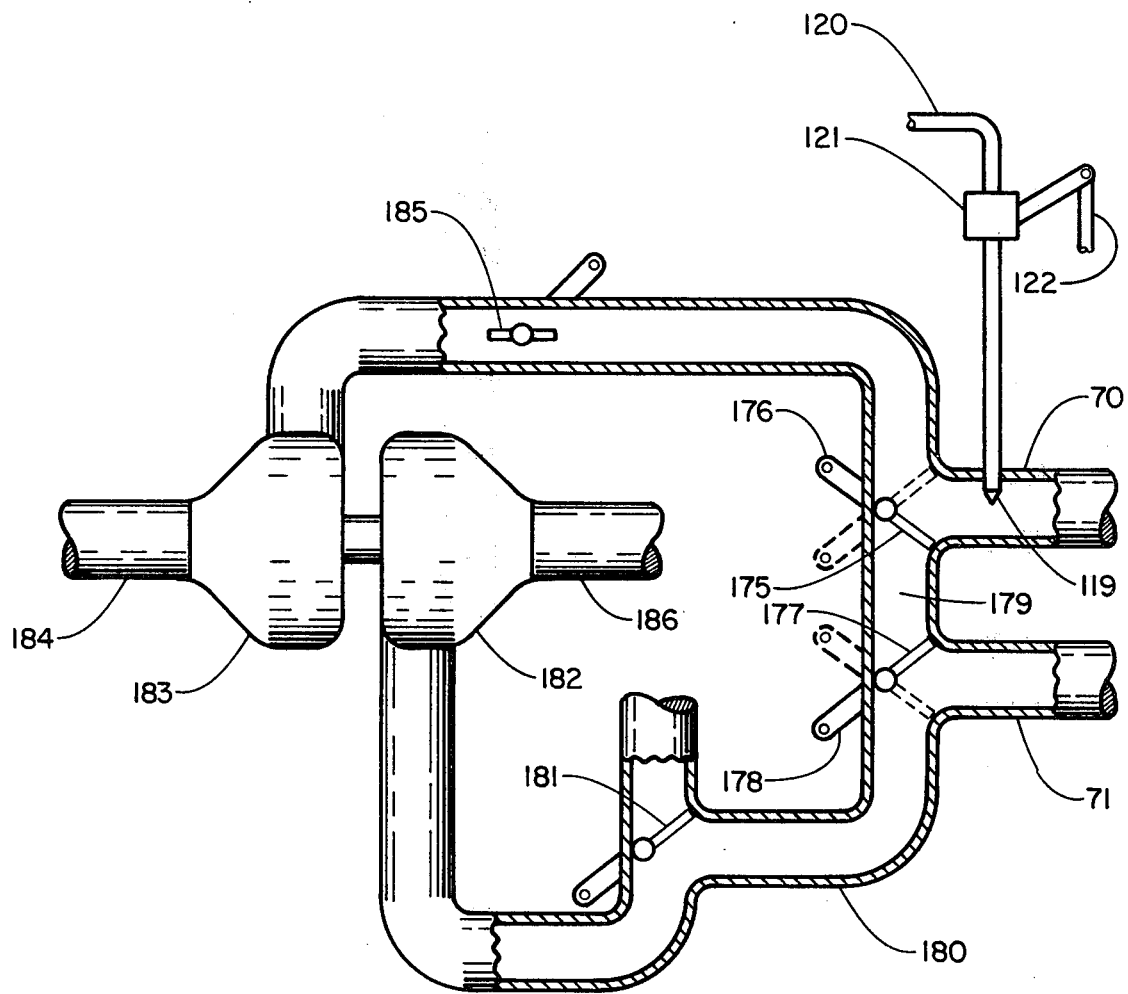

In FIG. 12 are shown an exhaust gas driven gas turbine 182, driving an intake air supercharger, 183, as a means of engine torque control, together with bypass valves, 175, 177, to recirculate exhaust into the intake for engine stopping.

Figure 13:
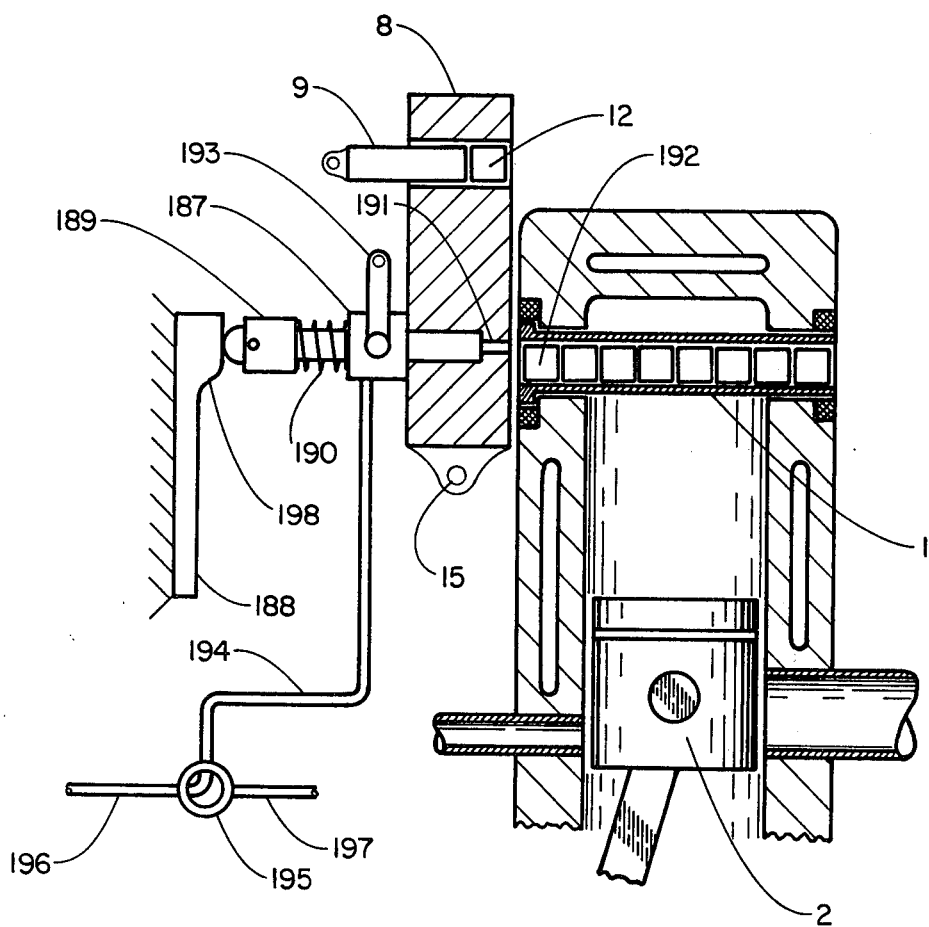

One scheme for operating a char burning engine wholly or partially on oil fuel is shown in FIG. 13 wherein an oil fuel pump, 187, pours oil upon char fuel, 192. This scheme can also be used for engine starting by supplying a readily ignitable liquid fuel via the pipe, 197.

Figure 14:
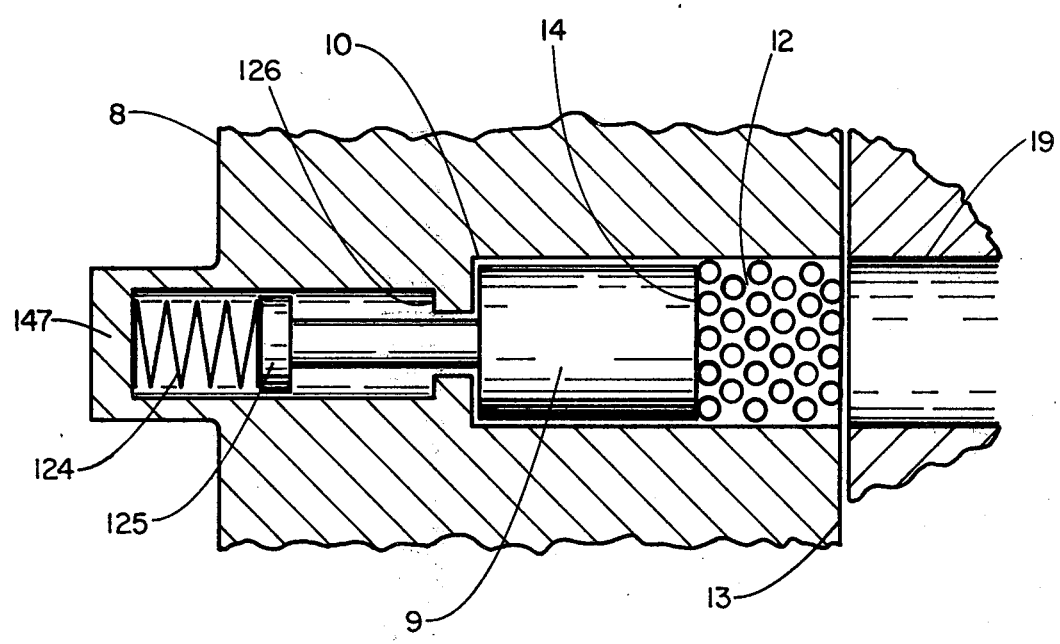
Figure 14:
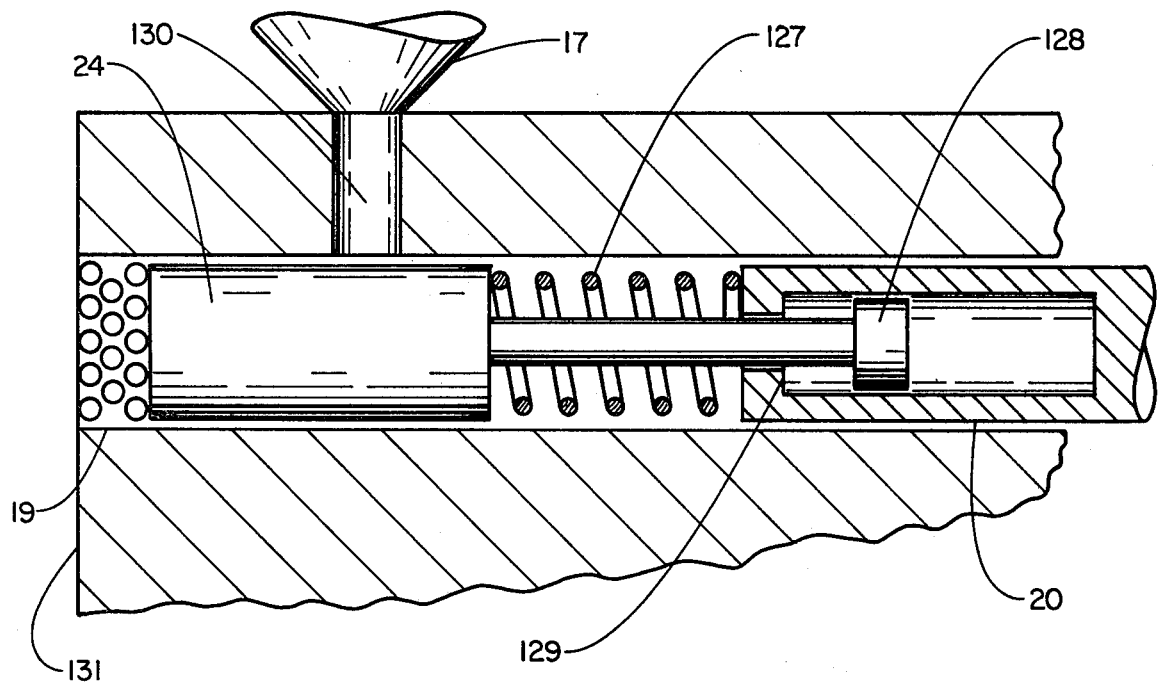

In FIG. 14 are shown examples of a spring-loaded refuel piston, 9, and also a spring-loaded reload ram piston, 20.

Figure 15:
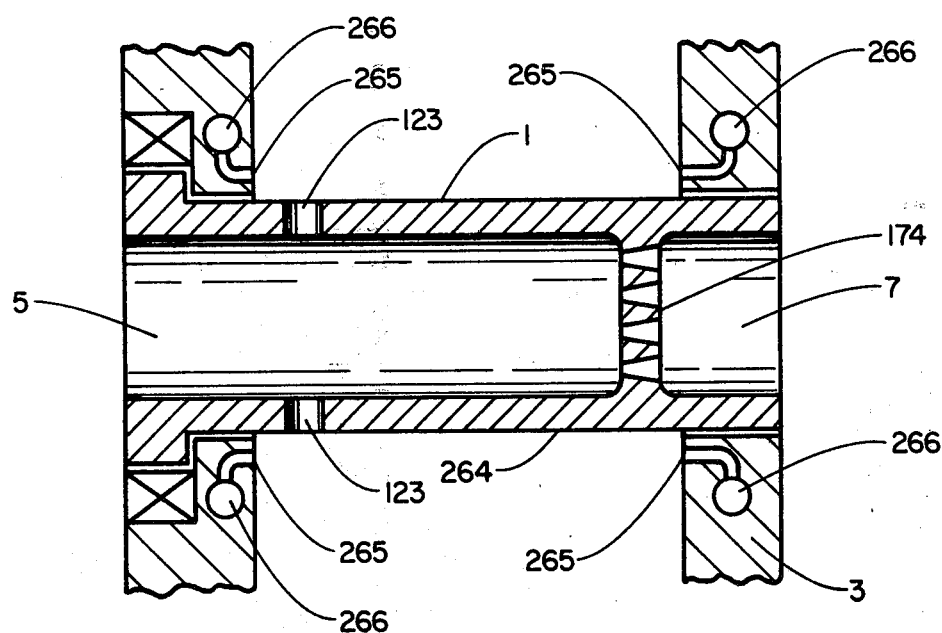
Figure 16:
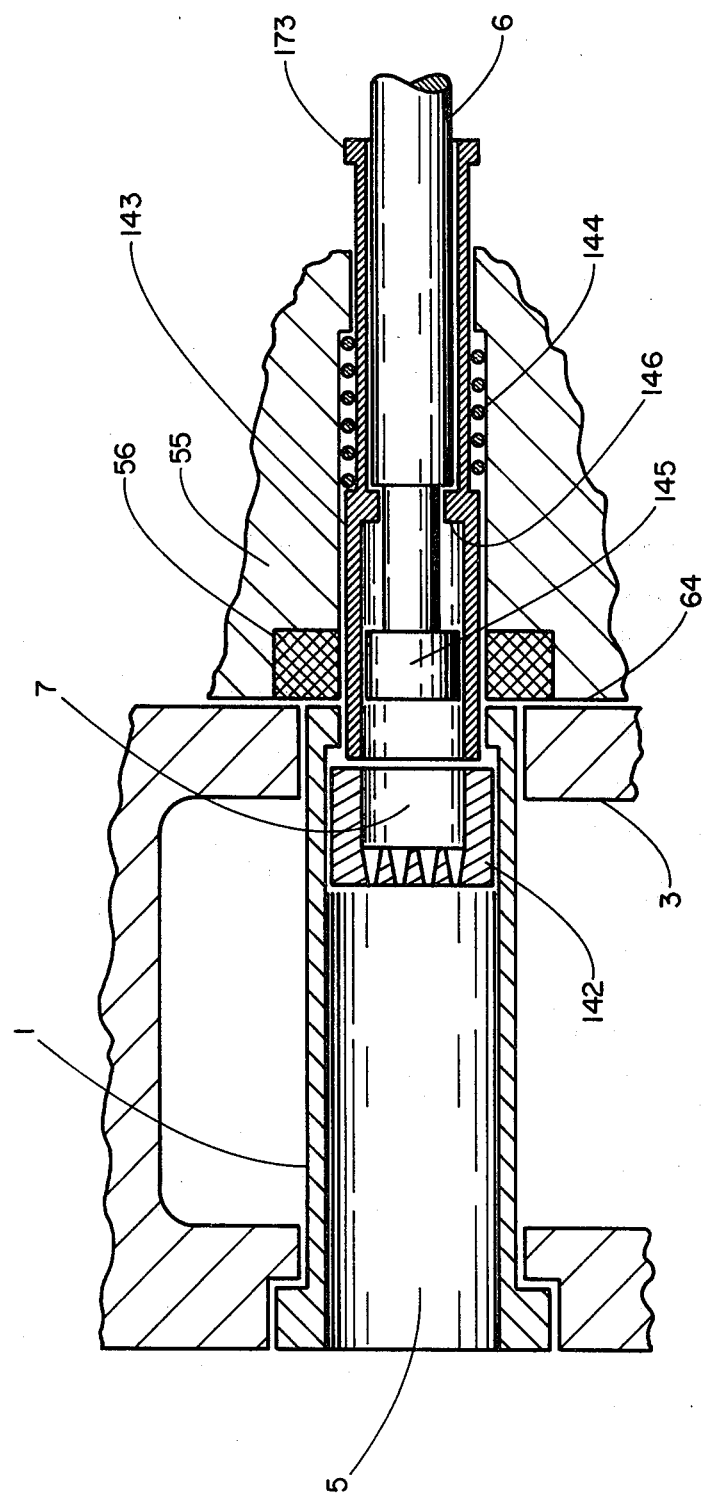

One arrangement for a fixed grate, 174, in the combustion chamber, 1, is shown in FIG. 15 together with a steam stratification scheme. An example of a moveable grate is illustrated in FIG. 16, wherein the grate, 142, is spring loaded via the sleeve, 143, which can also function as an ash level sensor.

Figure 17:
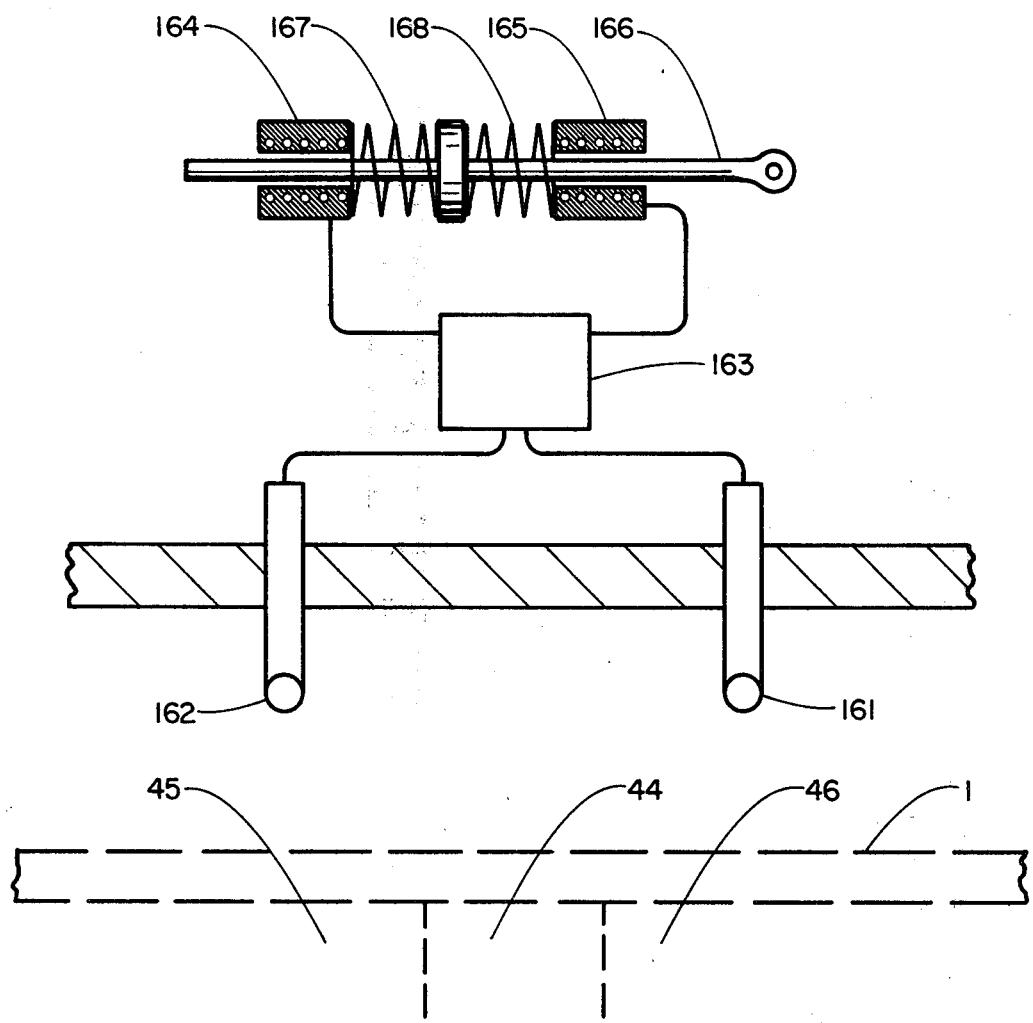

A scheme for electronic-mechanical ash level sensing and control is shown schematically in FIG. 17, wherein electrical temperature sensors, 161, 162, actuate a control circuit, 163, to control refuel quantity via the solenoid powered actuators, 164, 165, 166.

Figure 18:
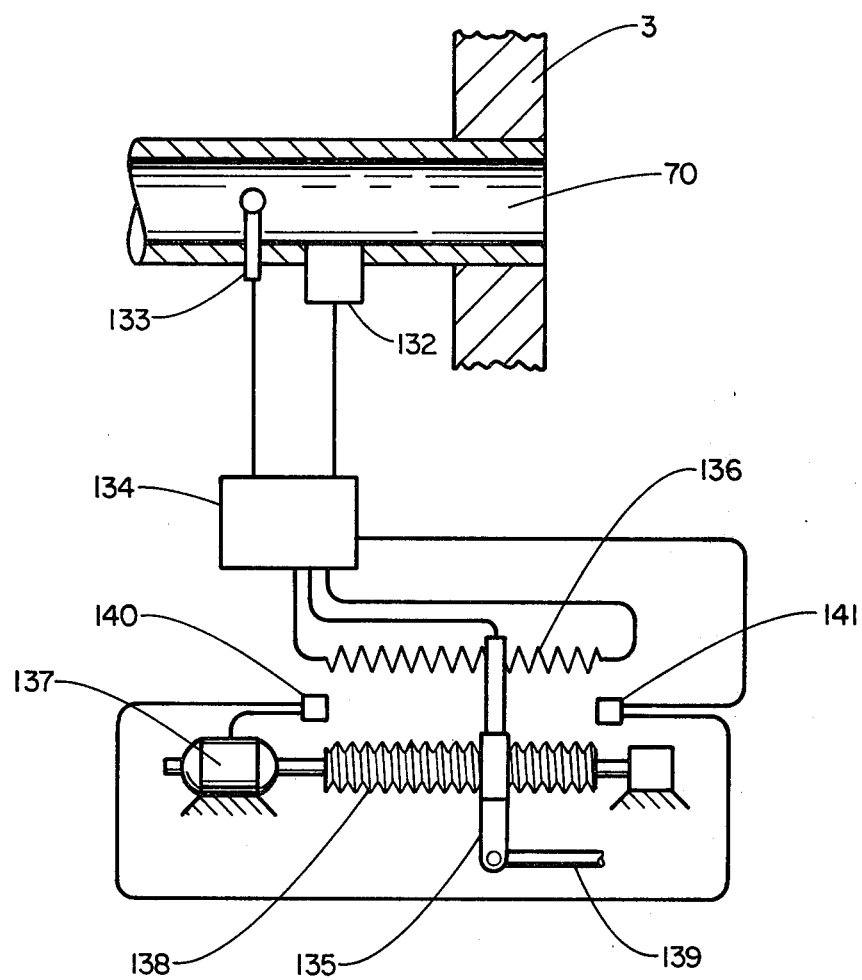

An air density sensor scheme for control of refuel quantity is shown schematically in FIG. 18, wherein intake air pressure, 132, and temperature, 133, sensors actuate a control circuit, 134, which moves a lever, 139, for refuel quantity control in proportion to intake air density.

Figure 19:
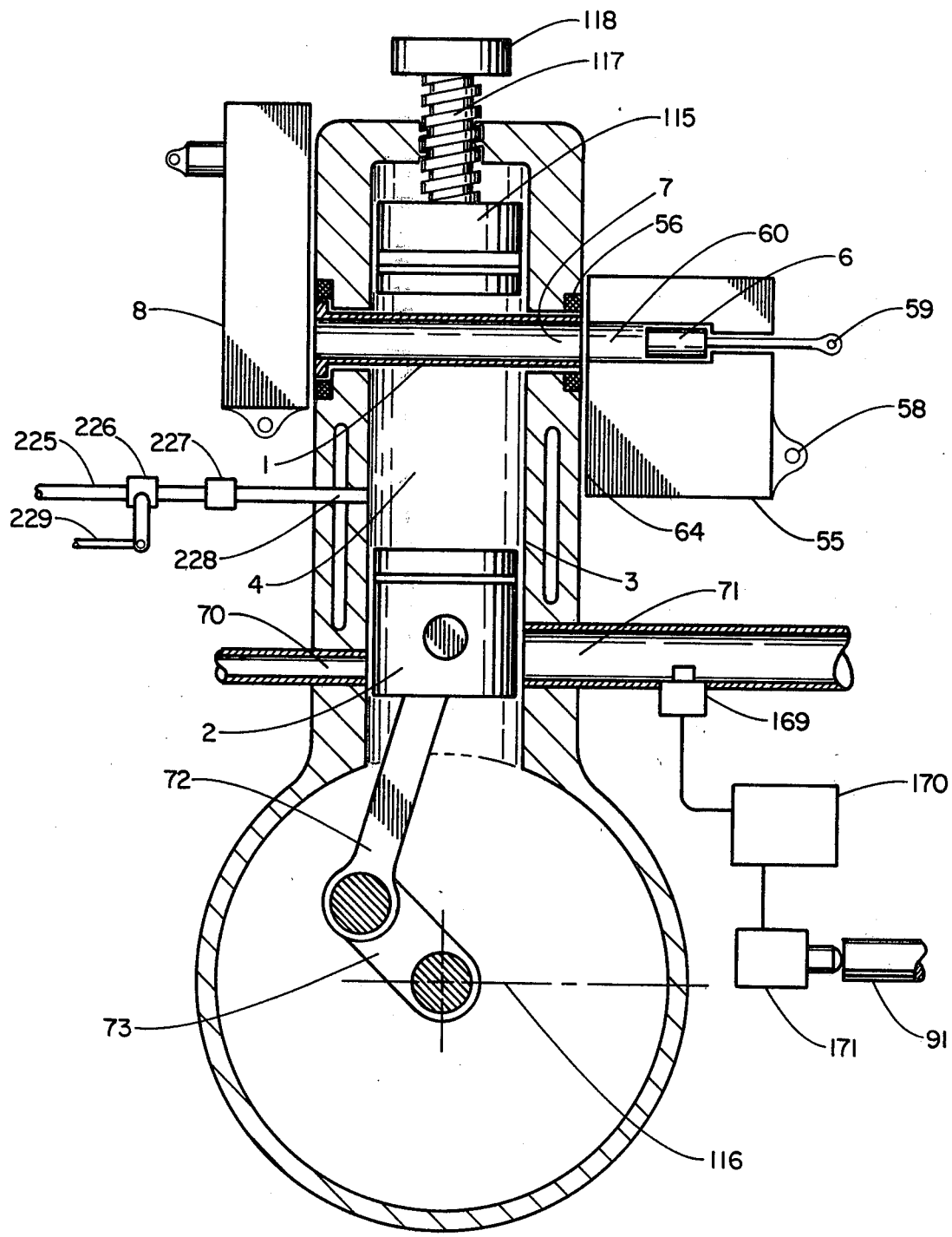

A scheme for control of ash removal interval is shown schematically in FIG. 19 and comprises an exhaust gas oxygen content sensor, 169, which acts via control circuit, 170, and actuator, 171, to initiate a cycle of ash removal by the ash removal mechanism, 6, 55, 58, 59, etc., whenever the char fuel quantity inside the combustion chamber becomes inadequate to fully utilize the available oxygen.

Figure 20:
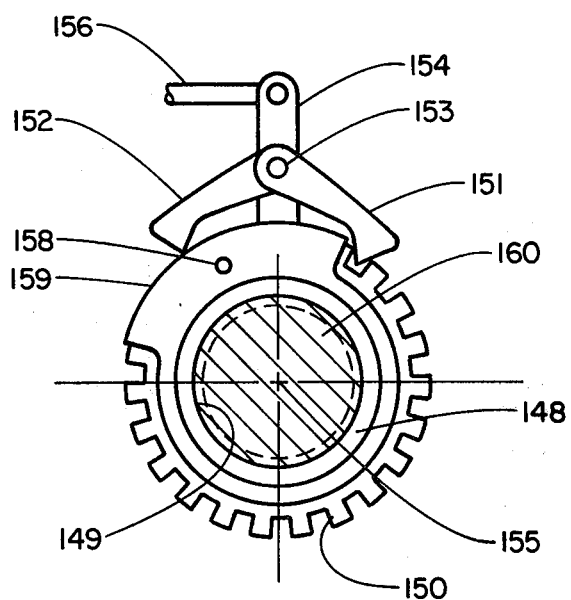

A turnbuckle, 148, driven via a double pawls, 151, 152, ratchet, 150, is shown in FIG. 20, with a moveable pawls shield, 159, and can be used as a control link between an ash level sensor and a refuel quantity setter.

A multicycle drive means for driving refuel or ash removal or reload or moveable combustion chambers is shown in FIGS. 21, 22 and 23 with FIGS. 21 and 22 being along their respective camshaft centerlines, 199, and, 200, and FIG. 23 being across the camshaft centerline, 199.

In FIG. 24 is shown a refuel quantity control scheme utilizing radiation from radioactive ash materials as a means for sensing the position of the ash zone in the engine combustion chamber, 1.

DESCRIPTION OF THE PREFERRED EMBODIMENTS

A particular principle upon which the char burning engines of this invention operate is that when air is compressed into the inside of the pores of a hot, solid char fuel, rapid reaction of carbon with the oxygen in the air can occur because they are in such close contact over the large area of the pores. Solid char fuels usually burn only slowly in air because the gaseous products of burning blanket the char with an oxygen free atmosphere and a large distance separates the hot char from unreacted oxygen. This inert gas blanket effect is especially effective inside the pores of the char since the combustion products formed therein can escape only very slowly through the narrow pores and correspondingly new oxygen can enter inside the pores only by slow diffusion. As a result, actual burning usually takes place largely on only the external surface areas of a solid char fuel and the much larger internal pore areas are essentially unused for burning. When, however, the air is compressed into the pore volume of the solid char fuel, the oxygen is mechanically forced into the pores and in consequence almost the entire internal pore area becomes available for burning. This area effect alone could increase carbon burn rate by a multiplier of about 20,000 for a char pore volume of 20 percent of the total volume, and most coal and wood char fuels are more porous than this. Burning is additionally speeded since compression increases the oxygen concentration gradient and thus the oxygen can diffuse more quickly to the solid carbon surface for reaction.

To use char fuels in an internal combustion engine requires that very rapid char burning take place so that reasonable engine speeds can be used, and also requires that most of this burning occur at or near piston top dead center on the compression stroke so that reasonable engine efficiency can be obtained. Using the carbon burn rate per unit area data of references A and B, and assuming the char pore area at 20 percent porosity to be fully useable for burning and a char temperature of about 2600° F., a char burn rate of 150 lbs. of oxygen per second is estimated for an engine of 12 to 1 compression ratio and of 567 cubic inches displacement when sufficient char is available that half of the air is inside the char pores. Complete reaction of available oxygen would thus occur in about 2 crank angle degrees at an engine speed of 5000 RPM. Thus, the burn rates are more than adequate to permit use of reasonable engine speeds. The actual rate of burning of the char as well as the cyclic timing of this burning will be determined by the rate of forcing oxygen into the char pores. Once oxygen has been forced inside the char pores, it will react very quickly with the adjacent hot carbon to form principally carbon monoxide. The rate of oxygen transfer into the pores and hence the rate of burning is determined by the piston motion during compression and also the temperature rise of the gas inside the pores due to burning therein. An approximate calculation of these piston motion and reaction heating effects shows that almost no reaction occurs until the last 40 degrees of crank rotation on the compression stroke and that 80% of the char burning reaction occurs between 28 degrees before top dead center and top dead center at an almost steady rate of 3 percent of the oxygen reacting for each crank angle degree of final compression. This distribution of the burning reaction is essentially independent of engine RPM, except as gas flow pressure drop in the char pores becomes excessive at very high engine RPM. Hence, char burning occurs principally at or near piston top dead center on the compression stroke as desired for high efficiency.

In a conventional diesel engine a high pressure atomizing nozzle is used in order to disperse the liquid fuel in tiny droplets throughout the air mass so that a large area is available for fuel evaporation and burning. In the char burning engine of this invention, we disperse a portion of the air mass throughout the pores of the fuel mass so that a large area is available for oxygen to react with carbon.

Types of Engines:

For a unit process engine, which burns the carbon largely to carbon monoxide, practically all of the air in the cylinder is forced into the char pore space. For a dual process engine the carbon monoxide formed inside the pores is to be burned further to carbon dioxide during the expansion stroke. For this dual process engine at least half of the air in the cylinder is not forced into the char pores and hence is available to burn the carbon monoxide as it emerges from the pores during expansion. We define here a pore volume ratio, RP, as the ratio of the char pore volume to the total gas space volume in the engine cylinder when the piston is at top dead center. Thus, for a unit process engine RP has a value near one. For a dual process engine RP has a value of no more than about 0.75 to 0.80 depending upon the extent of gas cooling to the cylinder walls and the reaction heating of the pore gas. Running values of RP for a dual process engine are best determined experimentally at minimum exhaust gas content of carbon monoxide.

Necessarily for unit process engines the entire burning process takes place prior to the end of the compression stroke. For dual process engines, the burning reaction is carbon monoxide occurs prior to the end of the compression stroke, and the further burning reaction to carbon dioxide occurs after the end of the compression stroke and during the early portions of the expansion stroke.

Engines may also be designed wherein some, but not all, of the carbon monoxide emerging from the char pores is burned to carbon dioxide inside the engine and for these engines an RP value between 1.0 and the value for dual process engines can be used. For these partial dual process engines, the remaining carbon monoxide may be subsequently burned to carbon dioxide in other apparatus outside the char burning engine.

Dual process engines may also be designed wherein the amount of air retained outside of the char pore volume is well in excess of that needed to burn the emerging carbon monoxide to carbon dioxide. This excess outside air form of the invention could be used with those char fuels which evolve appreciable quantities of volatile matter, in addition to the carbon monoxide, and the excess outside air is needed for the efficient burning of this volatile matter. Raw bituminous coal, coal char soaked with oil fuel, or inert ceramic pellets soaked with oil fuels are examples of high volatile matter fuels for which this excess outside air form of the dual process engine would usually be preferred.

As described previously adjustable dual process engines may be preferred in certain applications, as for example where the char engine exhaust is to drive a gas turbine engine and control of gas turbine inlet temperature is desired. The value of RP can be controlled with an adjustable displacer which can occupy that clear portion of the total cylinder volume at piston top dead center not occupied by the char fuel. When this clear volume is wholly filled by the adjustable displacer RP is one and this is a unit process engine. When this clear volume is not filled at all by the displacer RP has the dual process value of not more than about 0.75 to 0.80. At intermediate portions of the adjustable displacer the engine can be a partial dual process engine.

This adjustable displacer can be a piston separate from the engine piston, 2, whose position can be adjusted as described. Or the engine cylinder head can be made adjustable relative to the piston top dead center position to achieve the same result. Adjustment of the cylinder head or other such adjustable displacer can be made by hand or automatically in response to engine exhaust gas temperature and composition. Thus, by changing the size of the engine clearance volume not occupied by the char fuel the running value of RP can be adjusted while the engine is running. One example of such an adjustable displacer piston is shown in FIG. 19 and comprises a displacer piston, 115, adjustable relative to the crankshaft centerline, 116, by means of the threaded rotatable shaft, 117, and handwheel, 118.

Alternatively, the adjustment can be made via the char fuel itself. For example, a briquetted char fuel can be shaped to contain a clear volume separate from the char volume and, by changing the geometric shape of the char briquettes being used, the running value of RP could be changed. Similarly, with pelletized fuel the running value of RP could be changed by changing pellet size. Thus, by changing the geometry of the fresh char fuel being refueled, the running value of RP can be adjusted while the engine is running.

In these ways, the same engine can be operated as a unit process engine, as a dual process engine, as a partial dual process engine, or as a dual process engine with excess outside air.

The reaction of emerging CO with oxygen to form $CO_2$ can occur within the engine combustion chamber, and this is an internal dual process, or outside the engine combustion chamber, in the clear portion of the clearance volume, and this is an external dual process. Where dual process is obtained by changing fuel geometry, this will be an internal dual process and will elevate the gas temperatures within the char combustion chamber. Where dual process is obtained by use of an adjustable piston or cylinder head or by engine design, this can be an external dual process and the elevated gas temperatures will lie outside the char combustion chamber. When ashes are to be removed in a molten state, all or a portion of the dual process may be preferably internal in order to melt the ashes. The external dual process may be preferred where reduced engine jacket heat losses are sought and where reduced combustion chamber wall temperatures are sought.

Use of Steam and Oxygen Enrichment:

In some applications of char burning engines admission of steam into the engine cylinder may be desired. The steam also reacts with the char, via an endothermic reaction, to form carbon monoxide and hydrogen. In a unit process engine these extra fuel gas components in the char engine exhaust reduce the work output of the unit process char engine and permit an increase of work output from any gas turbine engine using the char engine exhaust as fuel. In this way, by use of steam in the char burning engine cylinder, the work distribution between the char burning engine and the following gas turbine engine can be adjusted and controlled by control of the steam to air ratio. In a dual process engine these extra fuel gas components react subsequently with the extra air outside the combustion chamber during expansion. Hence, the net reaction energy released before top dead center on the compression stroke is reduced and the net reaction energy released after top dead center on the expansion stroke is increased as more steam is admitted to the char engine cylinder relative to the intake air. This capability of adjusting the reaction distribution as between compression and expansion can be used for various purposes as, for example, to optimize the engine efficiency which varies with this reaction distribution. Excess steam admission can be used to stop the char burning engine since the steam-char reaction is endothermic.

When a porous solid carbon fuel is burned with air alone in an internal combustion engine, very high gas and solid carbon temperatures result and these temperatures are hereinafter and in the claims referred to as pore temperatures. Potentially, these pore temperatures can exceed the melting temperatures of many ceramic materials and other high-temperature materials otherwise suitable for use as engine combustion chamber parts. When, however, a porous solid carbon fuel is burned with air and steam together in an internal combustion engine, these pore temperatures are reduced since the steam and carbon reaction is endothermic. The greater the mol ratio of steam to oxygen, ap, within the pores the lower becomes the pore temperature. At a pore steam oxygen ratio of about 1.7 the net heat of reaction approaches zero and the resultant chilling of the solid carbon will prevent futher carbon burning and thus the maximum useable value of ap is below 1.7. The minimum value of ap is determined by the operating temperature capabilities of the high temperature materials used for the engine combustion chamber and could be zero with suitable materials or sufficiently low engine compression ratios.

When steam is admitted along with the air during the intake process of an internal combustion engine, less air enters the engine per cycle due to displacement by the steam. This reduction of engine air volumetric efficiency reduces engine torque capability. As discussed in the paper, "Studies of the Effects of Water on Gasoline Engine Wear at Low Temperature," Wear, Vol. 10, 1967, pgs. 33–48, increasing the steam content of the expansion gases of an internal combustion engine can increase engine corrosive wear or depletion of basic lubricating oil additives. Excess unreacted steam also acts to reduce engine efficiency by increasing the exhaust gas enthalpy losses. Hence, where steam is desired to be used in a char burning internal combustion engine, we prefer to use the least possible amount of steam for reasons of engine efficiency and engine wear, and we also prefer not to admit such steam during the engine intake process. These objectives can be achieved by admitting steam during the engine compression process and by placing this steam largely into that air mass which is forced inside the carbon pore spaces of the combustion chamber during compression.

One scheme for such steam admission at intake is shown in FIG. 12, and comprises a steam nozzle, 119, admitting steam into the engine intake pipe, 70, and receiving steam from a steam boiler via a supply pipe, 120, and steam admission valve, 121. Preferably, the steam admission valve, 121, admits steam to the intake pipe, 70, only during or shortly before the engine intake process, and can be thusly timed by opening and closing the steam admission valve, 121, via the lever, 122, by means of cams driven at camshaft speed for four stroke cycle engines and at crankshaft speed for two stroke cycle engines. Preferred schemes for steam admission during compression and with steam directed largely into the carbon pore spaces will be described hereinbelow.

Oxygen enrichment of the air can also be used and may be particularly useful in unit process engines when a fuel gas output of high calorific value is desired. Such addition of high purity oxygen can occur into the intake manifold as described above for steam admission. Alternatively, if oxygen is available at high pressure, it can be admitted directly into the engine cylinder, and preferably timed to be admitted during the early portions of the compression stroke of the engine. In this latter way, the air intake quantity is not reduced by the oxygen admission. One example means for admitting high purity oxygen to the engine is shown in FIG. 19 and comprises an oxygen supply pipe, 225, connected to an oxygen source, an oxygen admission valve, 226, a check valve, 227, and an oxygen admission nozzle, 228. The oxygen admission valve, 226, is actuated, via the lever, 229, from an engine driven cam or link, so that the valve, 226, is open only during the early portions of the engine compression stroke. The check valve, 227, prevents back flow of combustion gases whenever oxygen pressure is below engine cylinder pressure.

Chat Fuel Quantities:

The quantity of char fuel within the engine combustion chamber, 1, needs to be sufficient to provide the required pore volume, VP, so that the desired engine compression ratio, CR, is obtained. This char fuel volume, VCH, is given in terms of engine displacement volume per cylinder, VD, by the following relations:

$$\frac{VCH}{VD} = \frac{100\ RP}{(\%\ Pore)(CR - 1)}; \quad \text{Eqn. A}$$

wherein % Pore is the volume percent pore space within the char volume, VCH. For average char materials the char weight, WC, relative to the weight of air per engine cycle, Wa, is given by the following relation:

$$\frac{WC}{Wa} = \frac{100\ RP(138)\ [1 - (\%\ Pore/100)]}{(\%\ Pore)(CR - 1)(da)}; \quad \text{Eqn. B}$$

wherein da is the engine intake air density in pounds per cubic foot and the 138 is the average carbon density, without pores, also in pounds per cubic foot. For example, for an engine CR of 12 to 1, a percent Pore of 50, an RP value of one, and an air density, da, of 0.075 pounds per cubic foot, about 166 lbs. of char are to be inside the combustion chamber for each pound of air taken into the engine cylinder during a single cycle.

We define here a pore reaction ratio, G, as the ratio of oxygen placed within the char pores to the total oxygen supplied per engine cycle. Thus, for a unit process engine G has a value of one and for a dual process engine G has a value of no more than about one half. The relation between the pore reaction ratio, G, and the pore volume ratio, RP, is as follows:

$$\left[\frac{G}{1-G}\right] = \left[\frac{RP}{1-RP}\right]\left[\frac{T}{TP}\right]\left[\frac{1}{1.21}\right]; \quad \text{Eqn. C}$$

wherein the ratio, T/TP, is the ratio of gas temperature outside the pores, T, to average gas temperature inside the pores, TP, with the piston at top dead center at the end of the compression stroke. Note that at the limiting case for RP of one, G also has a value of one.

As the engine runs on this char fuel as being consumed and must be replaced at intervals of N engine cycles per cylinder. Between char replacement intervals char burn down increases the volume and reduces engine compression ratio. Hence the refuel interval, N, in engine revolutions is related to the allowable decrease of engine compression ratio, CCR, by the following approximate relations when air alone is used:

$$\frac{CCR}{CR - 1} = \frac{0.175(da)\ (G)\ (CR - 1)N}{[138 + 0.175(da)\ (G)\ (CR - 1)N]} \quad \text{Eqn. E}$$

$$N = \frac{138(CCR)}{0.175(da)\ (G)\ (CR - 1)\ (CR - 1 - CCR)};$$

For example, with the previously assumed engine conditions, an allowable CCR of one requires a refuel interval, N, of about 100 engine cycles per cylinder.

The amount of replacement char fuel to be put into the combustion chamber at each refueling, rwc, in pounds, is given by the following approximate relation when air alone is used:

$$rwc = 0.175(da)(G)(N)(VD); \quad \text{Eqn. F}$$

Again, for the previous engine conditions, the refuel quantity, rwc, is about 1.3 lbs of char fuel for an engine cylinder of one cubic foot displacement, VD.

We thus see that reasonable and practical char weights, refuel intervals and refuel quantities can be used for this char burning engine. Shorter refuel intervals with smaller refuel quantities can, of course, be used and the change of engine compression ratio can be thusly reduced if desired.

Combustion Chamber:

The combustion chamber, 1, constitutes a means for containing the char fuel and ashes separated mechanically from the piston, 2, and cylinder, 3, of the engine and providing ready flow of air from the engine displacement volume, 4, into the pores of the char fuel during compression and further providing ready flow of gases from the pores of the char fuel into the engine displacement volume during expansion. Since the walls of the combustion chamber are in close contact with the burning char, a high temperature material is preferred, such as a porous ceramic material with the ceramic pores providing the gas flow passages. Cooling of the combustion chamber walls can occur partly by heat transfer into the engine cooling jacket via the combustion chamber mountings and partly by heat capacitor cooling to the air charge flowing from the cylinder into the char fuel during compression. Such heat capacitor type cooling is common in prior art internal combustion engines as, for example, the ceramic insulators on gasoline engine spark plugs. Improved heat capacitor cooling of the combustion chamber can be secured by increasing the thickness of the chamber walls. Improved heat transfer cooling of the combustion chamber via the mountings thereof can be achieved by using chambers of a shorter length and larger cross sectional area. A water or air cooled, metal, combustion chamber with ceramic covering can also be used, but is complex and costly to build. Where a porous ceramic combustion chamber is used and the ceramic pores are the gas flow passages maximum useable engine RPM may be determined by the gas flow pressure drop across these ceramic pores. Too great a flow pressure drop will reduce engine efficiency and eventually will seriously reduce the amount of oxygen actually reaching the char pores. Where higher engine speeds are to be used, the ceramic porosity and pore size can be increased but only up to a pore size which starts to allow ashes to escape from the combustion chamber. For still higher engine speeds, gas flow ports, 123, can be placed through the combustion chamber walls, as shown for example in FIG. 15, to provide adequate gas flow area. Such gas flow ports are preferably placed toward the refueling end, 5, of the combustion chamber, so that ashes cannot escape thereby, and are preferably used with briquetted or pelletized fuel or fuel contained in cannisters, with the ports smaller than the fuel particles so that the fuel cannot escape thereby. Where such gas flow ports are used they are preferably arranged to distribute air inflow during compression around and along the char fuel mass and for dual process engines to direct the pore gas outflow during expansion for good mixing with the unreacted air in the clear space of the cylinder. Combustion chambers with gas flow ports can also have ceramic pores which can assist in proper distribution of the air inflow during compression. These gas flow ports, when positioned near the refueling end, 5, of the combustion chamber, can also aid in the clean burning of char fuels containing volatile matter, such as raw coal. As the volatile matter is being distilled out of the fresh fuel near the refuel end, it is important to mix air promptly into the volatile matter vapors to assure their clean, sootless burning and the gas flow ports can be arranged to do this by placing them toward the refuel end of the combustion chamber.

Just as gas flow pressure drop through the ceramic pores of the combustion chamber wall can limit maximum useable engine speed, so also can gas flow pressure drop into and out of the char fuel. Additionally, the central portions of a chunk of char fuel will burn only slowly since incoming oxygen will be captured first by the carbon in the outer portions of the char pores. These twin problems of char pore pressure drop and unequal char burnup can be minimized for higher speed engines by proper arrangements of the char fuel mass within the combustion chamber. Crushed fuel and pelletized fuel will shorten the average char pore length and also provide interstitial flow passages between separate pellets and chunks, thus reducing char pore pressure drop and also distributing oxygen more nearly uniformly throughout the char mass. Where combustion chamber wall ports are also used, the crushed fuel and the pelletized fuel can additionally be briquetted. Gas flow passages, such as radial grooves, can be made into the char fuel briquettes to further reduce gas flow pressure drop therein and to more nearly equally distribute the incoming oxygen. If the char fuel is placed within containers or cannisters, these latter can be provided with gas flow passages to reduce gas flow pressure drop and to more nearly equally distribute the incoming oxygen. Reduced char pore pressure drop and improved oxygen distribution can also be achieved by use of longer combustion chambers with smaller cross sectional area, but combustion chamber wall cooling problems will be aggravated as discussed previously.

Some char fuel fragments can perhaps survive into the ashes and become especially difficult to burn if encapsulated in ash materials. To aid in burning up these final char fragments, the ash level can be kept reasonably deep in the combustion chamber so that oxygen can reach these fragments through the ashes. Air flow passages can also be put into the combustion chamber end of the ash removal piston, 6, to further aid in burning up these final char fragments, but a screen of ceramic or other material is needed to prevent ash particle escape.

The combustion chamber is fastened into the engine cylinder so as to allow for the difference in thermal expansion between the very hot combustion chamber and the relatively cold cylinder. Other than those possible thermal expansion stresses, the combustion chamber is not stressed except slightly by the gas flow pressure drop. The combustion chamber fastenings need not be a gas tight seal but only a fuel and ash tight seal. These fastenings also serve as a heat transfer passage for cooling of the combustion chamber walls. Various types of fastenings can be used to fulfill these requirements. For example, flexible tubular metal sealing rings can be used at each end of the combustion chamber, with the refuel end, 5, axially secured and the ash haul end, 7, axially free to expand.

Refuel Mechanism:

The refuel mechanism, comprising the refuel block, 8, and the drive means for the refuel block, is a means for adding fresh char fuel into the combustion chamber at intervals and for sealing the refuel end, 5, of the combustion chamber during all engine compression and expansion processes. In this way, as the char fuel is burned up, it is replaced at refuel intervals of N engine revolutions.

Figure 1:
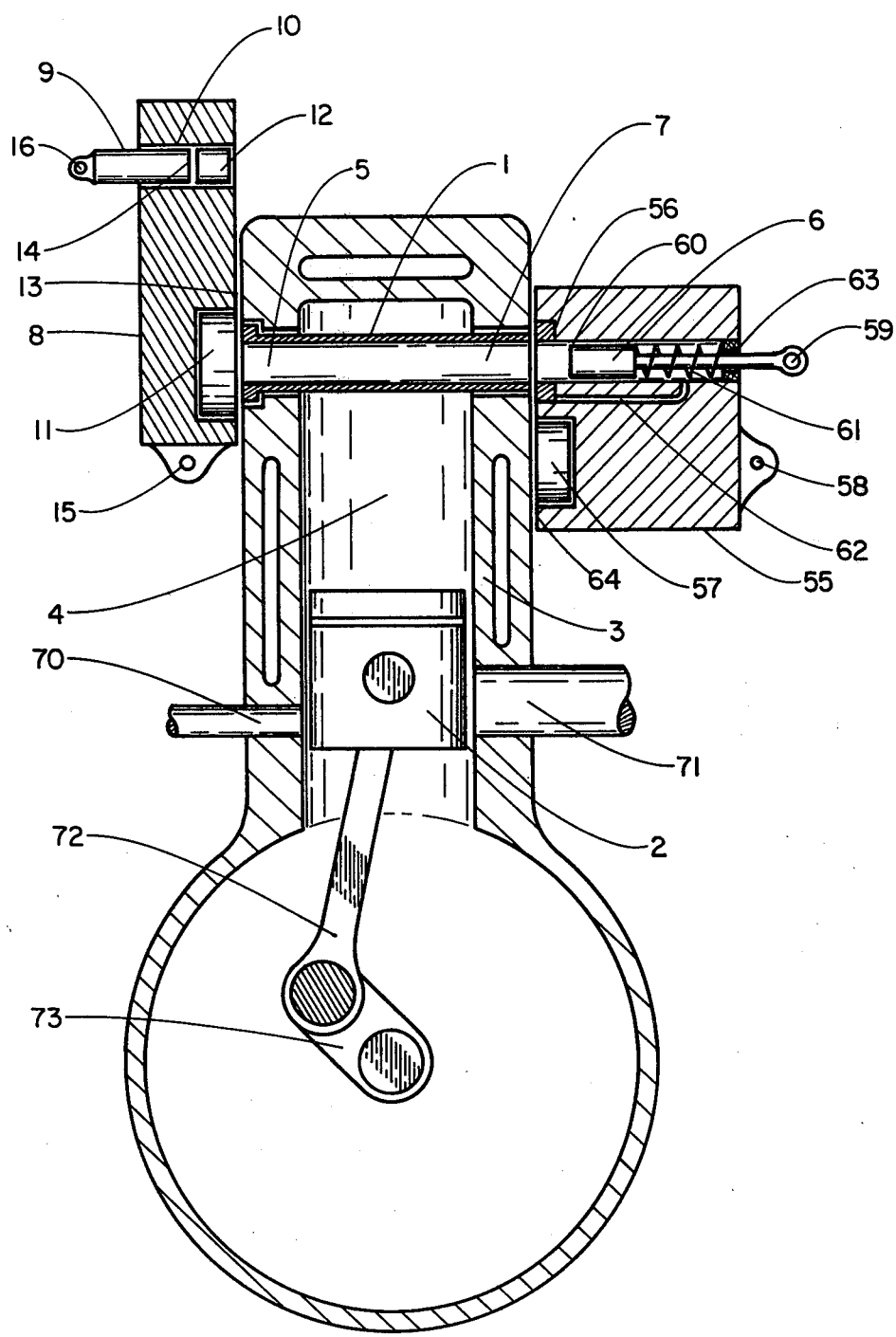
In FIG. 1 is shown a simplified schematic diagram of one form of char burning internal combustion engine. A two stroke cycle internal combustion engine is shown in FIG. 1, with intake air ports, 70, and exhaust ports, 71, engine piston, 2, and cylinder, 3, and connecting rod, 72, and crankshaft, 73. Char fuel is burned in the porous combustion chamber, 1, during engine compression. Fresh char fuel is refueled into the combustion chamber, 1, by the refuel mechanism comprising the refuel block, 8, and the refuel piston, 9. Ashes are removed from the combustion chamber by the ash removal mechanism comprising the ash removal block, 55, and the ash piston, 6. Several details are not shown on FIG. 1, such as the drive means for the refuel mechanism and the drive means for the ash removal mechanism, to avoid undue complexity.

The refuel block, 8, comprising the refuel piston, 9, and cylinder, 10, and the sealing unit, 11, is a means for adding fresh char fuel into the combustion chamber, 1, at the refuel end, 5, and for sealing the refuel end of the combustion chamber. The refuel piston, 9, operates inside the refuel cylinder, 10, and these have a displacement volume at least equal to the maximum refuel volume required. When the engine is running and not being refueled, the refuel block, 8, is positioned to align the sealing unit, 11, over the refuel end, 5, of the combustion chamber, 1, thus sealing the refuel end as is shown in FIG. 1. Refueling is accomplished by positioning the refuel block, 8, so that the refuel piston, 9, and refuel cylinder, 10, are aligned with the combustion chamber, 1, and then moving the refuel piston, 9, through its refuel stroke toward the combustion chamber, 1, thus forcing the fresh char fuel quantity, 12, into the combustion chamber. At the end of the refuel stroke, the refuel piston end, 14, is preferably flush with the sliding surface, 13, between the refuel block, 8, and the end of the combustion chamber so that the refuel block, 8, can slide over into the sealing position without chopping off the char fuel quantity, 12, or locking up on the piston, 9. When the engine is to use a multi-cycle refuel drive means, as described hereinafter, the refuel block, 8, is additionally fitted with means for sealing the refuel end of the combustion chamber also when refueling is occurring with the refuel piston, 9, aligned with the combustion chamber, 1. Alternatively, the sealing means, 11, can be mounted into the engine cylinder surface, as shown for example in FIGS. 13 and 19, and thus perform the sealing function for both positions of the refuel block. The refuel drive means acts on the refuel block, 8, at the connection point, 15, and on the refuel piston, 9, at the connection point, 16. When a refueling cycle is completed and the sealing unit, 11, is again aligned over the refuel end of the combustion chamber, 1, the refuel piston, 9, is retracted back from the refuel stroke and, together with the refuel cylinder, 10, is aligned with the reload mechanism which places another fresh char fuel quantity, 12, into the displacement volume created by such retraction of the refuel piston. This reload mechanism is not shown in FIG. 1 and is further described hereinafter. Suitable guideways, not shown in FIG. 1, can be used to hold the refuel block, 8, securely against the sliding surface, 13, against the unseating force due to engine combustion chamber pressures, and to guide the refuel block back and forth through the cycle of refueling. Provision for cooling the refuel block, 8, refuel piston, 9, and sealing unit, 11, can also be used and are not shown in FIG. 1. The refuel block, 8, shown in FIG. 1 has linear motion through the refueling cycle but other arrangements and motions of the refuel block are also useable. For example, a cylindrical refuel block inside cylindlical guideways could be used with rotary motion of the refuel block about its centerline of symmetry or with combined rotary motion about this centerline and linear motion along this centerline. Even rolling motion of the refuel block along the surface, 13, could be used, and would reduce friction and wear, but two rollers would be needed, one for sealing and another for refueling.

The refuel block is driven through the refuel cycle by the refuel block drive means which is a means for driving the refuel block through the refuel cycle at each refuel interval so that refuel block motion takes place preferably only during engine intake and exhaust processes and so that the refuel end of the combustion chamber is sealed during all engine compression and expansion processes. For slow and medium speed engines, the drive for the refuel block can be arranged to carry out the entire refuel cycle during a single exhaust and intake process of the engine and this is called a single cycle drive means. Alternatively, the drive for the refuel block can be arranged to carry out the entire refuel cycle in a series of steps carried out over two or more engine cycles and this is called a multi cycle drive means. The multi cycle drive means will often be preferred in higher speed engines in order to reduce the inertia forces within the refuel mechanism. At the end of each refuel interval of N engine revolutions, the refuel block drive means drives the refuel block, 8, and refuel piston, 9, through the following sequence of events which is the refuel cycle:

a. The refuel block is moved over to align the refuel piston with the combustion chamber, 1.

b. The refuel piston is moved toward the combustion chamber with a stroke pushing the fresh char fuel quantity, 12, into the combustion chamber.

c. The refuel block is moved back to align the sealing portion, 11, over the refuel end, 5, of the combustion chamber, 1. Concurrently, the refuel piston, 9, and cylinder, 10, are placed in position to receive another charge of fresh char fuel, for the next following refuel cycle, from the reload mechanism.

d. The refuel piston, 9, is moved back to provide space for the new charge of fresh char fuel either concurrently with or subsequently to step C above. Concurrently or subsequently the reload mechanism places a new charge of fresh char fuel into the refuel cylinder, 10. At the end of this refuel cycle, the refuel mechanism is again ready to carry out the next similar cycle of refueling at the end of the next following refuel interval. For a single cycle drive means, steps a, b, and c are to be completed at the time of a single exhaust and intake process of the engine, which would be within one engine revolution for a four stroke cycle engine. For a multicycle drive means each of the individual steps, a, b and c, is preferably completed within the time of a single exhaust and intake process of the engine in order to minimize leakage of compressed gases. For single cycle or multi cycle drive means, step d need only be completed prior to commencement of the next following refuel cycle. To drive the refuel mechanism through this refuel cycle, engine driven cams, cam followers and suitable linkage can be used as is already well known in the art of mechanisms. Hydraulic or hydraulic assisted drive means can also be used. Cams, rotated at a speed reduced in the ratio of 1/N from the engine crankshaft, can be used with the refuel block drive means but either cams of very large base circle diameter are needed or the forces between cam and follower will be large. This result follows from the fact that the refuel interval, N, is typically of the order of 100 or 200 engine revolutions whereas the refuel cycle time for steps a, b and c, is of the order of 1 or a few engine revolutions. More reasonable cam sizes and forces can be achieved by using a dual speed drive means comprising, a refuel drive cam, driven at engine crankshaft or engine valve camshaft speed, which carries out the refuel cycle when its cam follower is engaged, at the end of each refuel interval, by action of the refuel interval cam, driven at a speed reduced in the ratio of 1/N from the engine crankshaft. With this dual speed drive means, the refuel cycle can be carried out quickly, as desired, since the refuel drive cam acts within one or a few engine cycles. The refuel interval cam assures that refueling occurs only once for each refuel interval by keeping the refuel drive cam follower disengaged from the refuel drive cam until the expiration of the refuel interval and then engaging the refuel cam follower to the refuel drive cam for only one full refuel cycle. This engagement and disengagement of the refuel drive cam follower to and from the refuel drive cam are preferably timed to occur only when the follower would be or is on the drive cam base circle in order to minimize mechanical clatter.

A single speed refuel block drive means can be achieved by having the refuel drive cams, driven at a speed reduced in the ratio of 1/N from the engine crankshaft, operate the valves of a hydraulically powered refuel block drive means. This hydraulic assisted drive means will allow use of single speed cams of reasonable size with reasonable cam forces. Electric motor or pneumatic assisted refuel block drive means can also be used.

One particular example of a mechanical, dual speed drive means suitable for use as a refuel drive means, as an ash removal drive means, as a reload mechanism drive means, and as a moveable combustion chamber drive means is shown schematically in FIG. 8 and also in FIG. 9, which is a cross section view taken from FIG. 8 as indicated thereon. A refuel drive cam, 74, is driven, as by gears or chains, at engine crankshaft or camshaft speed about the centerline, 75, with base circle radius, 76, in the direction, 77, and its lifting section, 78, acts on the primary refuel drive cam follower, 79. When the moveable refuel drive cam follower, 80, is engaged to the primary refuel drive cam follower, 79, as shown in FIGS. 8 and 9, the moveable refuel drive cam follower, 80, acts upon the secondary refuel drive cam follower, 81, which in turn acts via the connection, 82, and one of the refuel block connections, such as, 15, to drive the refuel block through the refuel cycle. The moveable refuel drive cam follower, 80, is pivoted about the centerline, 83, and is moveable along this centerline as a means of engaging and disengaging the moveable refuel drive cam follower, 80, to and from the primary refuel drive cam follower, 79. As shown in FIG. 8, the refuel block, 8, will be driven through its refuel cycle as the lifting section, 78, of the refuel drive cam, 74, passes the primary refuel drive cam follower, 79, return motions being secured by the return springs, 84 and 85. Engagement and disengagement of the moveable refuel drive cam follower, 80, to and from the primary refuel drive cam follower, 79, can be carried out by the refuel interval cam, 86, shown in FIG. 9, which is rotated about the centerline, 87, at a speed reduced in the ratio 1/N from the engine crankshaft, as by gears or chain drive, in the direction, 88, with base circle radius, 89. The lifting section, 90, of the refuel interval cam, 86, acts on the refuel interval cam follower, 91, to lift the moveable refuel drive cam follower, 80, into engagement with the primary refuel drive cam follower, 79, and is shown in this position in FIG. 9. When, however, the refuel interval cam follower, 91, is returned by the return spring, 92, back on to the refuel interval cam base circle, 89, the moveable refuel drive cam follower, 80, is in the dashed outline position, 93, and is there disengaged from the primary refuel drive cam follower, 79, and in this position the refuel block is thus not acted upon by this refuel drive means. The angular position and angular extent of the lifting section, 90, of the refuel interval cam, 86, are selected to insure that engagement of the primary refuel drive cam follower, 79, is to occur within a single revolution of the refuel drive cam, 74, and only when the primary refuel drive cam follower, 79, is on the base circle, 76, of the refuel drive cam. These timing arrangements, together with the stop, 94, on the secondary refuel drive cam follower, 81, assure that such engagement and disengagement can occur without mechanical interference and that only a single refuel cycle takes place. The drive means shown in FIGS. 8 and 9 can be used as a single cycle drive means or as a multicycle drive means with the cam lifting sections differing. Where motion is to occur only during engine exhaust and intake processes the lifting section, 78, of the refuel drive cam, 74, is timed accordingly, and for this purpose we prefer to drive the refuel drive cam, 74, at crankshaft speed for two stroke cycle engines and at camshaft speed for four stroke cycle engines. Return motions are spring actuated in FIGS. 8 and 9 but positive return motion can alternatively be used via separate positive return drive or via captured cam followers. A similar set of dual cams and followers can also be used to drive the refuel piston, 9, via its connection, 16, through its prescribed motions during refueling, or the refuel interval cam, 86, can engage two moveable refuel drive cam followers, one for moving the refuel block, 8, and one for moving the refuel piston, 9. The drive means shown in FIGS. 8 and 9 and described hereinabove is only one particular example of a mechanical drive means and it is not intended thereby to limit the invention to this one drive means.

One particular example of a mechanical, multicycle, dual speed drive means suitable for use as a drive means for the refuel block, or the refuel piston, and also suitable for use as a drive means for the ash removal mechanism, the reload mechanism and the moveable combustion chamber, if used, is shown in FIGS. 21, 22 and 23. A refuel block engage cam, 201, and a refuel block retract cam, 202, are driven about the centerline, 199, at camshaft speed. The raised section, 203, of the engage cam, 201, acts via its primary cam follower, 204, the moveable cam follower, 205, and its secondary cam follower, 206, to move the refuel block into alignment with the combustion chamber, 1, at its refuel end, 5, so that refueling can occur at the desired time in the cycle, when the moveable cam follower, 205, is engaged to the engage primary cam follower, 204. Similarly, the raised section of the retract cam, 202, acts via its primary cam follower, 207, the moveable cam follower, 205, and its secondary cam follower, 208, to move the refuel block back from the refueling position into the reloading position after the several cycles devoted to refueling have occurred, at the desired time in the cycle, when the moveable cam follower, 205, is engaged to the retract primary cam follower, 207. The several return springs act on the cam followers to carry out return motions. The interval cam, 209, is driven about the centerline, 200, at a speed reduced in the ratio of 1 to N from the speed of the camshaft, 199, and determines to which primary cam follower, 204, 207, the moveable cam, 205, is engaged. When the interval cam follower, 210, is on the raised section, 211, the moveable cam follower, 205, is engaged to the retract primary cam follower, 207, as shown in solid outline in FIGS. 22 and 23, and retraction of the refuel block to reload occurs. When the interval cam follower, 210, is on the recessed section, 212, the moveable cam follower, 205, is engaged to the engage primary cam follower, 204, as shown in the dotted outline, 213, and engagement of the refuel block to refuel occurs. When the interval cam follower is on the base circle, 214, the moveable cam follower, 205, is not engaged to either of the primary cam followers as shown in the dotted outline, 215, and no motion of the refuel block occurs. The spring, 216, keeps the interval cam follower, 210, on the interval cam, 209. With this drive mechanism, the refuel block is driven through a refuel cycle once in every N camshaft revolutions and the number of cycles taken for refueling is equal to the number of cycles between the recessed engage portion, 212, and the raised retract portion, 211, of the interval cam, 209. Hence, both the refuel interval and the number of cycles used for refueling are fixed as set by the design of the interval cam. Preferably, the cams, 201, 202, 209, are timed so that motion of the refuel block takes place during exhaust and intake processes. Also, the interval cam, 209, is timed relative to the engage cam, 201, and the retrack cam, 202, so that motion of the moveable cam follower, 205, occurs only when the primary cam follower to be engaged or disengaged is on the base circle of its cam, to aviod mechanical interference.

The form of char fuel used and also the manner of controlling the refuel quantity, rwc, determine what the motion pattern of the refuel piston, 9, shall be. The engines of this invention can burn char fuel in the forms of: crushed fuel, pelletized fuel, briquetted fuel, briquetted pellets or particles, or char fuel placed within containers or cannisters or can use inert porous carriers soaked with oil. The briquetted and pelletized fuel forms can also be either of fixed size or of adjustable size. Examination of equation F shows that if a fixed refuel interval of N engine revolutions is used the refuel quantity, rwc, must be adjustable to accommodate variations of intake air density, da. Alternatively, if a fixed refuel quantity, rwc, is to be used, the refuel interval, N, must be adjustable to accommodate variations of intake air density, da. Briquettes of fixed size and preloaded cannisters have a fixed refuel quantity, rwc, and hence the drive means must have an adjustable refuel interval, N. Adjustable briquettes and pelletized and crushed char fuel can operate with a fixed refuel interval, N, and with the refuel quantity, rwc, adjustable as, for example, by the reload mechanism. Usually the adjustable refuel quantity, rwc, will be preferred as mechanically simpler. For all of the above char fuel forms a fixed stroke length of the refuel piston, 9, can be used and with the piston end, 14, flush with the sliding surface, 13, at the end of the refuel stroke. For all of the above char fuel forms, it is essential that the refuel piston end, 14, not be indexed within the combustion chamber when refuel block motion is to occur. For briquetted char fuel and fuel in cannisters, it is essential that the end, 14, of the refuel piston, 9, be flush with the sliding surface, 13, at the end of the refuel stroke when refuel block motion is to occur. These requirements are needed to avoid mechanical interference. When crushed fuel or pelletized fuel are used, the refuel piston can be driven via a spring with maximum piston stroke fixed but with actual piston stroke varying with the amount of fuel the spring loaded piston can force into the combustion chamber. In effect, this variable actual stoke, spring actuated refuel piston adjusts the refuel quantity, rwc, at the time of refueling. One example of a variable stroke, spring actuated refuel piston scheme is shown in FIG. 14, wherein the refuel piston, 9, is driven for refueling by the spring, 124, this spring being recompressed when the reload mechanism forces additional char fuel, 12, into the refuel cylinder, 10, during reloading as described hereinafter. The stops, 125, 126, assure that the face, 14, of the refuel piston, 9, cannot extend beyond the sliding surface, 13, of the refuel bloc, 8. A pneumatic or constant pressure hydraulic drive could be substituted for the spring, 124, for the driving of the refuel piston, 9, during refueling, and this pneumatic or hydraulic pressure could be reduced or eliminated during reloading. Reduced forces during reloading could also be achieved with the spring actuated refuel scheme of FIG. 14 by making the spring end holder, 147, retractable during reloading. A variable stroke can also be achieved by use of hydraulic or pneumatic drive of the refuel piston. Where refuel quantity, rwc, is fixed, as with preloaded cannisters, the refuel interval, N, can be adjusted in various ways, as, for example, by having the refuel interval controller act to engage the refuel drive cam follower to the refuel drive cam.

Reload Mechanism

The reload mechanism is a means for reloading a quantity of fresh char fuel into the refuel mechanism for use in the next following refuel cycle. This is a materials handling function and many of the means already well known in the art of materials handling will be suitable. Commonly the reload mechanism will transfer char fuel from a supply hopper or bin and place it into the refuel cylinder of the refuel mechanism. The reload mechanism may additionally function to process the fresh char fuel during such transfer, as for example, by pelletizing or briquetting the fuel. Further additionally, the reload mechanism may be used to control the quantity of fresh char fuel reloaded in order to maintain a total char fuel quantity within the engine combustion chamber adequate to assure essentially maximum possible reaction of the available oxygen with char fuel and which will also assure essentially maximum possible reaction of the char fuel while within the engine combustion chamber. All forms of the reload mechanism must perform the transfer function. Some forms of the reload mechanism will additionally perform one or more process functions. Other forms of the reload mechanism will additionally perform control functions, with or without process functions. A preferred form of the reload mechanism transfers the fresh char fuel, briquettes the fuel during transfer and controls the refuel quantity for best utilization of both the char fuel and the oxygen in the air, and this particular preferred form will be described herewith without, however, limiting the invention to this form.

Figure 2:
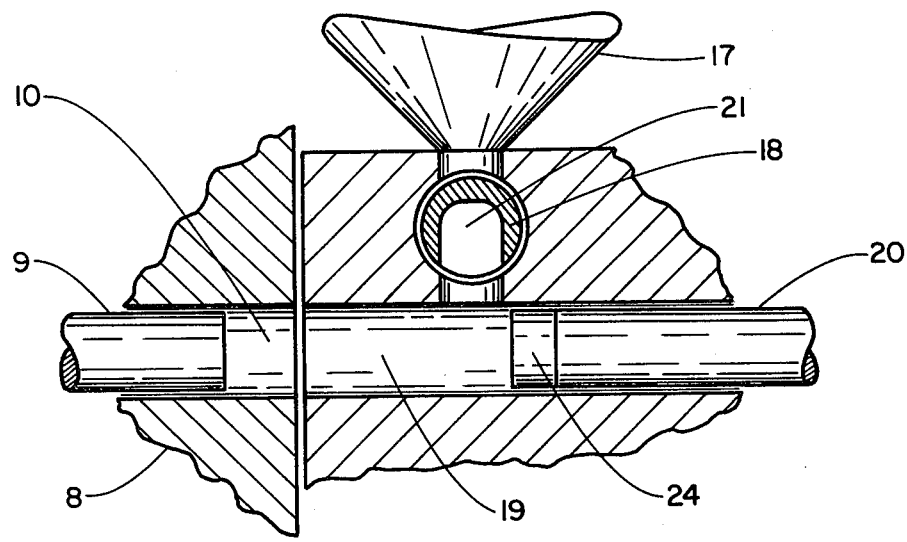
In FIG. 2 are shown various details of one form of reload mechanism which transfers fuel from a char fuel hopper, 17, into the refuel piston, 9, of the refuel mechanism. One form of the hopper valve, 18, of the reload mechanism is shown in FIG. 3.
Figure 3:
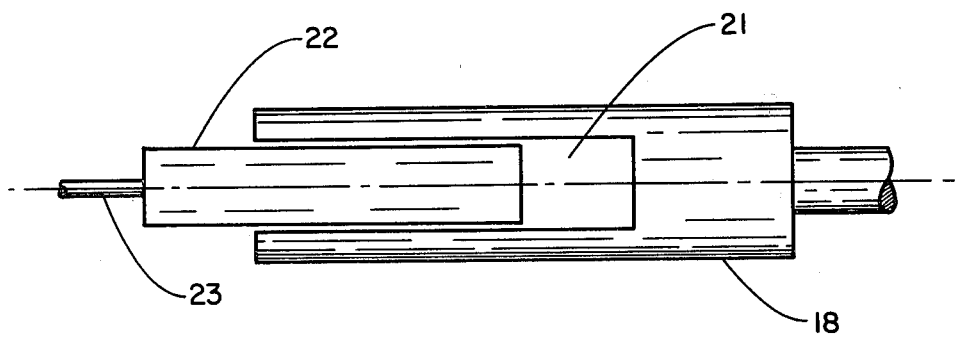

One arrangement of the fuel charging portion of the reload mechanism is shown in FIGS. 2 and 3 as aligned for reload with the refuel cylinder, 10, and refuel piston, 9, of the refuel block, 8. From the char fuel hopper or bin, 17, a quantity of fresh char fuel is delivered, by rotation of the hopper valve, 18, into the reload cylinder, 19. The reload ram piston, 20, then forces this char fuel quantity into the refuel cylinder, 10, and against the refuel piston, 9. The volume of the char cavity, 21, in the hopper valve, 18, is adjustable by moving the cavity block, 22, via the control link, 23, the cavity block being preferably locked when refilling from the hopper, 17, occurs and released for control link adjustment when the hopper valve is empty and being rotated back after delivering the char quantity into the reload cylinder, 19. The hopper valve, 18, can be rotated by any one of several means but is preferably so rotated, via linkwork from the refuel block, 8, as the refuel block moves into the reload position at the end of a refuel cycle. Briquetting of the fuel, if desired, can be carried out by the reload ram piston, 20, pressing the fuel quantity firmly against the now locked refuel piston, 9. For briquetting the reload ram piston, 20, can be spring loaded to a mechanical drive or hydraulic or pneumatic drive can be used. The shape of the briquette can be changed by changing the shape of the reload ram piston crown, 24, either by simply using different crown pieces or by adjusting portions of the crown, 24, via linkage passing through the reload ram piston, 20, when such briquette shape changes are to be made while the engine is running.

Where pre-pelletized or crushed char fuel is supplied to the hopper, 17, the reload ram piston, 20, can deliver the refuel quantity into the refuel cylinder, 10, against a spring loaded refuel piston, 9, and the reload ram piston, 20, then holds a fixed position flush with the sliding surface, 13, of the refuel block, 8, until the next refueling cycle has commenced, in order to prevent the refuel quantity from spilling back into the reload cylinder, 19. Subsequently, the reload ram piston, 20, can be withdrawn to pick up the next refuel quantity.

Another example of a spring loaded reload piston is shown in FIG. 14, suitable for use with the spring loaded refuel piston, 9, also shown on this same FIG. 14. The reload ram piston, 20, is fitted with a crown, 24, which is driven to reload by the piston acting via the spring, 127, between the reload ram piston, 20, and the crown, 24. The crown, 24, is retracted after refueling has commenced by the reload ram piston, 20, when the stops, 128 and 129, engage and the reload ram piston, 20, is then retracted sufficiently that the reload cylinder, 19, can be refilled with fresh char fuel via the hopper, 17, the crown, 24, being then clear of the hopper port, 130. During reloading the maximum extension of the crown, 24, as limited by the stops, 128, 129, and the reload motion of the reload ram piston, 20, is such that the crown, 24, does not extend beyond the surface, 131, in order to avoid mechanical interference during refueling. The refuel block, 8, covers the end of the reload cylinder, 19, during refueling to prevent fuel spillage. The crown, 24, could alternatively be driven pneumatically or by a constant pressure hydraulic system instead of the mechanical scheme shown in FIG. 14.

As shown by equation F the refuel quantity, rwc, which is also the reload quantity of fresh char fuel, varies directly with the engine intake air density, da, and the refuel interval, N. Thus, if a fixed refuel quantity, twc, is used the refuel interval, N, must be adjusted for the variations of air density, da, used to control engine torque. Alternatively, and preferably, a fixed refuel interval, N, is used and the refuel quantity, rwc, is adjusted for variations of air density, da. In the FIGS. 2 and 3 form of reload mechanism, this adjustment of the refuel quantity, rwc, is made by moving the cavity block, 22, in or out of the hopper valve char cavity, 21, via the control link, 23. An air density sensor and control can be used as a means for adjusting the refuel quantity to be proportional to the engine intake air density and thus to the engine torque.

Control of Reload and Refuel Quantity

Engine intake air density, da, being directly proportional to intake air absolute pressure, MAP, and inversely proportional to intake air absolute temperature, Ta, can be sensed via the ratio of these two measured quantities. An electronic-mechanical control device using electrical pressure and temperature sensors as input can produce a mechanical output proportional to air density, da, for adjustment of the refuel quantity, rwc, and one example of such is shown schematically in FIG. 18. A pressure sensor, 132, and a temperature sensor, 133, are mounted in the engine intake pipe, 70, and their signals are combined in the control device, 134, to generate a voltage proportional to intake air density, da, and this voltage is compared to the voltage at the slider, 135, across the slide wire resistor, 136. When these two voltages differ, the control device, 134, turns on the motor, 137, which moves the slider, 135, along the resistor, 136, by the threaded shaft, 138, until the two voltages match and the motor is then turned off. In this way, the position of the slider, 135, is proportional to intake air density, da, and the refuel quantity, rwc, can be controlled proportionally thereto by connecting the slider, 135, to the refuel quantity controller via the link, 139. Motor stop switches, 140, 141, can prevent override of the slider, 135.

Alternatively, intake air pressure and temperature can be sensed and their ratio obtained mechanically to produce a mechanical control output for refuel quantity directly proportional to intake air density. One example of such a mechanical air density sensor and control scheme is shown in FIGS. 4 and 5, wherein an intake air pressure sensor, 25, acts via a lever, 26, whose length is set by an intake air temperature sensor, 27, upon the refuel quantity control lever, 28, to set the refuel quantity, rwc. Engine intake air pressure acts via the connection, 29, upon the sealed and evacuated aneroid chamber, 30, the motion of whose end, 31, against the spring, 32, is thus proportional to intake air pressure. The aneroid housing is pinned to the stationary point, 33, and the pivot, 34, of the refuel quantity control lever, 28, is pinned to a stationary point. Thus the end, 35, of the lever, 26, is moved in proportion to absolute engine intake air pressure. The length of the lever, 26, about the pivot, 34, is set by the engine intake air temperature sensor, 27, shown in greater detail in FIG. 5. Intake air passes, via the connections, 36 and 37, over the temperature responsive element, 38, and thus bring this element up to engine intake air temperature. A sealed, partially liquid filled, vapor pressure temperature sensor is shown in FIG. 5 whose vapor pressure acts against the spring, 39, to change the length of the lever, 26, in approximate proportion to the absolute intake air temperature. Other types of temperature sensors can be used such as bimetallic elements, liquid expansion elements or gas expansion elements. In most cases, these various temperature sensors will respond only approximately linearly to absolute temperature but the response can be made adequately close to linear over the rather narrow range of usual engine intake air temperatures. With the lever, 26, arranged at right angles to the motion of the pressure sensor, 25, the resulting motion at the end, 40, of the refuel quantity control lever, 28, is proportional to the ratio of engine absolute intake air pressure to engine absolute intake air temperature and hence to engine intake air density, da. The refuel quantity control lever, 28, can act via suitable linkage, 41, to so adjust the cavity block, 22, in the hopper valve, 18, that the refuel quantity, rwc, increases in proportion to intake air density, da, as desired. The intake air density sensor and control scheme shown in FIGS. 4 and 5 is only one example of a mechanical device and other types of air density sensor and control schemes can also be used.

The engine intake air density, da, may vary widely during a refuel interval, N, for engine applications with rapid and large torque variations. For these applications, the averaged intake air density is preferably used to control refuel quantity, rwc. For example, an averaging, double acting, dishpot can be linked to the mechanical air density sensor and control shown in FIGS. 4 and 5, so that the control links, 28 and 41, move very nearly in proportion to the average air density during the preceding refuel interval. Where electronic-mechanical air density control schemes are used, electronic averaging devices can be employed to average the air density over the preceding refuel interval.

In a continuously running engine whose refuel quantity, rwc, is controlled, either by volume or by weight, by an engine intake air density sensor and control, it must eventually occur that the refuel quantity, rwc, is either somewhat too small or somewhat too large. These discrepancies of the refuel quantity must inevitably arise not only due to the imperfections of the refuel quantity control scheme but especially due to variations in ash content of the fresh char fuel being refueled. It is well known that the ash content of coals varies, not only between different mines but even between different batches taken from the same vein in the same mine. The fresh char fuel can also vary in other ways as, for example, in porosity and density. When the refuel quantity is thusly inadequate for a period of engine running char volume in the combustion chamber gradually decreases and eventually the available char pore reaction area may become inadequate to fully utilize the available oxygen and the engine torque will then gradually decrease, even though intake air pressure is maintained. On the other hand, when the refuel quantity is too large for a period of engine running, the char volume in the combustion chamber gradually increases and eventually unburned char will be forced into the ash removal means and discharged from the engine incompletely burned producing a loss of engine efficiency. To avoid both of these undesireable effects the refuel quantity, rwc, can be adjusted to maintain a total char quantity within the engine combustion chamber adequate to assure essentially maximum possible reaction of the available oxygen with char fuel and which will assure essentially maximum possible reaction of the char fuel while within the engine combustion chamber. Of course, perfect oxygen utilization and perfect char burning can never be fully attained. The total char quantity can be assessed at that portion of the combustion chamber not occupied by ashes and the boundary region between the ashes and the char is herein referred to as the ash zone and its position within the combustion chamber as the ash level. Moving the ash level closer to the refuel end of the combustion chamber allows the char fuel greater time to be burned up but will eventually result in incomplete oxygen utilization. Moving the ash level closer to the ash removal end of the combustion chamber provides the oxygen improved opportunity to react with char fuel but will eventually result in discharging unburned char with the ashes. Hence, an ash level sensor and control scheme can be used to maintain the ash zone at the ash level representing the best balance between oxygen utilization, on the one hand, and char burn-up on the other. When the ash level sensor finds the ash level too close to the refuel end of the combustion chamber, it is to actuate the control scheme to increase the refuel quantity, rwc, and thus cause the ash level to move away from the refuel end. When the ash level sensor finds the ash level too close to the ash removal end of the combustion chamber, it is to actuate the control scheme to decrease the refuel quantity, rwc, and thus cause the ash level to move away from the ash removal end.

Sensing of the ash level position in the engine combustion chamber can be done by temperature gradient methods, by electrical conductivity methods, by position sensor methods if a moveable ash grate is used, and by other methods. If the ashes are to be removed in a molten state, the ash level can be determined from the larger electrical conductivity of molten ash as compared to the char fuel. Alternatively, the ash level of the molten ash can be determined from the large change of temperature gradient from almost zero within the molten ash to large values within the char adjacent thereto. If the ashes are to be removed in a dry state, the ash level can be determined from the temperature gradient between the gases emerging from burning char and the gases emerging from unreactive ashes. Alternatively, the ash level of the dry ash can be determined from the larger electrical conductivity of the char as compared to the dry ash.

Use of a moveable grate to essentially separate the burning char regions from the regions of burned up ashes provides a simple mechanical ash level sensor means since the grate constitutes an adequate approximation to the ash zone. With this moveable grate a mechanical link can connect from the grate or grate housing directly to an adjuster, for example on the control link, 23, of the cavity block, 22, in the hopper valve, 18, of the reload mechanism. The adjuster on the contrl link can be of the same type as that described hereinafter for the example mechanical temperature gradient ash level sensor.

Where electrical temperature gradient sensors or conductivity sensors are used, the control scheme is preferably an electronic-mechanical device using the sensors output as its input and generating, as control device output, a mechanical adustment of the refuel quantity, rwc, by methods already well known in the art of electronic-mechanical devices.

One example of such an electronic-mechanical ash level sensor and control is shown in FIG. 17 and comprises an electrical temperature sensor, 161, placed on one side of the preferred ash level position, 44, another electrical temperature sensor, 162, placed on the other side of the preferred ash level position, 44, with burning char on one side, 45, and burned up ashes on the other side, 46. A control circuit, 163, energizes either one solenoid, 164, or the other solenoid, 165, or neither solenoid of this double acting solenoid. Each solenoid, when energized, pulls the refuel quantity control link, 166, toward itself and the springs, 167, 168, center the control link, 166, between these two positions. When solenoid, 164, is energized the control link, 166, acts to increase the refuel quantity, rwc, when solenoid, 165, is energized the control link, 166, acts to decrease refuel quantity, rwc, and when neither solenoid is energized the refuel quantity is not changed. The control link, 166, can thusly act to change the refuel quantity in various ways as, for example, by use of the ratchet driven turnbuckle described hereinbelow. Were the ash zone, 44, to move over into the region, 45, both temperature sensors would be adjacent to cooler ashes and the control circuit, 163, would energize solenoid 164 in order to increase the refuel quantity, rwc, and thus restore the ash level to the desired position, 44. Were the ash zone, 44, to move over into the region, 46, both temperature sensors would be adjacent to hotter burning char and the control circuit would energize solenoid 165 in order to decrease the refuel quantity, rwc, and thus restore the ash level to the desired position, 44. When the ash level is at the desired position, 44, the temperature sensor, 161, is adjacent cooler ashes and the temperature sensor, 162, is adjacent hotter burning char and the control circuit, 163, would not energize either solenoid, 164 or 165, so the refuel quantity would not change.

Wholly mechanical ash level sensor and control schemes can be devised and an example of one such is shown in FIG. 6, wherein two sealed vapor pressure or gas pressure temperature sensing bulbs, 42, 43, are positioned adjacent but external to the engine combustion chamber, 1, and on both sides of the intended ash level position, 44, with burning char on one side, 45, and burned up ashes on the other side, 46. The sensing bulbs, 42 and 43, and connected moveable portions, 47, 48, are designed and proportioned so that, when a bulb, such as bulb 43, is adjacent to hot burning char in the region, 45, the moveable portion, 48, is extended against the fixed stop, 49, and also so that when a bulb, such as bulb, 42, is adjacent to cooler burned up ashes in the region, 46, the moveable portion, 47, is withdrawn against the fixed stop, 50. The two bulbs, 42, 43, are alike and their moveable portions are both connected via pins to the bar, 51, which connects in turn at its midpoint to the control link, 52, which acts on the fuel charging mechanism to adjust refuel quantity, rwc. Where the ash zone, 44, to move over into the region, 45, both bulbs, 42, 43, would be adjacent to cooler ashes and both moveable portions, 47, 48 would be against the lower temperature fixed stops, 50, 53, and in this position the control link, 52, acts to increase the refuel quantity, rwc. Where the ash zone, 44, to move over into the region, 46, both bulbs, 42, 43, would be adjacent to hotter burning char and both moveable portions, 47, 48, would be against the higher temperature fixed stops, 49, 54, and in this position the control link, 52, acts to decrease the refuel quantity, rwc. When the ash zone, 44, is located in the desired position between the two bulbs, 42, 43, the moveable portion, 48, is against the higher temperature stop, 49, and the moveable portion, 47, is against the lower temperature stop, 50, and in this position the control link, 52, does not act to change the refuel quantity, rwc. In this way, the ash level sensor and control shown in FIG. 6 acts to keep the ash zone, 44, at or near the desired level within the engine combustion chamber, 1, by adjusting the refuel quantity, rwc, via the control link, 52. The control link, 52, can act thusly directly on, for example, the cavity block, 22, in the hopper valve, 18, of the fuel charging mechanism shown in FIGS. 2 and 3. Preferably, however, the control link, 52, can act indirectly upon, for example, the control link, 23, connecting to the cavity block, 22. A turnbuckle with right and left hand threads can be located in the refuel quantity control link, 23, and rotated by action of the pawls of a double acting, shielded pawls ratchet drive, similar to that shown in FIG. 404, page 314, of reference C, except that two pawls are used, one to turn the ratchet on the turnbuckle one way, and thus to increase refuel quantity, and the other to turn the ratchet on the turnbuckle the other way and thus to decrease refuel quantity. One example arrangement of this ratchet driven turnbuckle is shown in FIG. 20 and comprises the turnbuckle, 148, threaded right and left hand on its inner bore, 149, and fitted with a ratchet, 150. The two pawls, 151, 152, are pivoted at, 153, on the pawls arm, 154, which latter is moved back and forth about the centerline, 155, via the linkage, 156, from the refuel mechanism. The pawls shield, 157, is rotatable about the centerline, 155, and is connected at, 158, to the ash sensor control link. The pawls shield, 157, has a lifted section, 159, of sufficient arc length that both pawls, 151, 152, are unengageable to the ratchet, 150, when the shield is centered on the pawls arm mid travel, and only one pawl is engageable to the ratchet, 150, when the shield is to either extreme of its motion by the ash sensor control link. Clearly pawl, 151, rotates the ratchet, 150, and turnbuckle, 148, in one direction and pawl 152 in the opposite direction when engaged. The turnbuckle bolts, 160, are placed, for example, into the control link, 23, connecting to the cavity block, 22, of the reload refuel quantity control scheme. The pawls shield is so connected to the ash sensor control link, for example control link 52, that the refuel quantity, rwc, is incrementally increased by action of this ratchet and turnbuckle mechanism whenever the ash level is too close to the refuel end of the engine combustion chamber; is incrementally decreased by action of this ratchet and turnbuckle mechanism whenever the ash level is too close to the ash removal end of the engine combustion chamber; and is left unchanged whenever the ash level is at the desired position in the engine combustion chamber.

Radiation from radioactive ash materials can also be used for ash zone level detection since the burning of the char concentrates the ash thus increasing the radiation intensity and changing the radiation intensity gradient. Some coal ash contains naturally occurring radioactive ash materials while for other coals radioactive ash materials can be deliberately added into the char fuel. Either radiation intensity or preferably radiation intensity gradient can be used to sense ash zone position in the engine combustion chamber. One particular example of such a radiation intensity gradient sensor for ash zone level is shown in FIG. 24 together with a control scheme which changes refuel quantity in response to changes in ash zone level in the combustion chamber. A portion of the combustion chamber, 1, is shown in FIG. 24 with the preferred ash zone level at, 44, and with burning char on one side, 45, and burned up ashes on the other side, 46. Well collimated radiation intensity sensors are mounted in the combustion chamber wall adjacent to the combustion chamber with two sensors, 220, 221, positioned to receive radiation from the intended char burning zone, 45, and two sensors, 222, 223, positioned to receive radiation from the intended burned ashes zone, 46. The controller, 224, receives as input the radiation intensities as sensed by the sensors, 220, 221, 222, 223, and responds as follows:

a. When a radiation intensity gradient exists in the region, 46, due to burning char having moved into this region, it will be shown by a difference in radiation intensity sensed by the sensors, 222, 223, and the controller, 224, then responds by reducing the refuel quantity, rwc, via the solenoids, 164, 165, and springs, 167, 168, acting on the refuel quantity control lever, 166, as already explained hereinabove. In this way, the ash zone level will then gradually move back toward the desired level, 44.

b. When no radiation intensity gradient exists in the region, 45, due to burned up ashes having moved into this region, it will be shown by no difference in radiation intensity sensed by the sensors, 220, 221, and the controller, 224, then responds by increasing the refuel quantity, rwc, via the solenoids, 164, 165, and springs, 167, 168, acting on the refuel quantity control lever, 166, as already explained hereinabove. In this way the ash zone level will then gradually move back toward the desired level, 44.

c. When a radiation intensity gradient exists in region, 45, and no radiation intensity gradient exists in region, 46, as sensed by the sensors, 220, 221, 222, 223, due to the ash zone level being in the desired position, 44, the controller, 224, then responds by energizing neither solenoid 164, or 165, and the refuel quantity, rwc, remains unchanged.

Hereinabove two different control schemes have been described for adjustment of the refuel quantity, rwc, air density control schemes, and ash level control schemes. These two different control schemes can be used alone or preferably in combination. When both control schemes are used in combination, the refuel quantity, rwc, is quickly adjusted for wide variations of engine torque as controlled by intake air density, da, and is additionally gradually corrected for variations in fuel properties by action of the ash level control.

Each cylinder of a multicylinder char burning engine must be served by a reload mechanism and the engine can be equipped with one reload mechanism for each engine cylinder. Alternatively, a single reload mechanism can serve several cylinders or preferably all cylinders of the engine, the reload mechanism being moved along from cylinder to cylinder to reload the separate refuel mechanism for each engine cylinder. Where the preferred single reload mechanism is used for all cylinders of a multicylinder engine, several arrangements for the control of refuel quantity, rwc, can be used as, for example:

1. Each cylinder has its own hopper valve and controlled cavity block connecting to its own ash level sensor and control and a common air density sensor and control.
2. All cylinders are served by the same hopper valve and controlled cavity block connecting to a common air density sensor and control and a single ash level sensor and control located in a "typical" engine cylinder.
3. All cylinders are served by the same hopper valve and controlled cavity block which is adjusted, just prior to each reloading, by the ash level sensor and control for the cylinder about to be reloaded, the air density sensor and control being the same for all engine cylinders. Other control arrangements can also be used.

Instead of controlling the refuel quantity, rwc, as described above, we can alternatively control the refuel interval, N, and this refuel interval control is necessary when a fixed refuel quantity, rwc, is used as with cannistered fuel or pre-briquetted fuel. The reload mechanism itself is simplified when refuel interval control is used since the reload quantity is constant and no adjustment means are needed here. The ash level sensor and control, or the air density sensor and control or a combination of both controls, can act to set and adjust the number of engine revolutions, N, to which a mechanical or electrical engine revolution counter device must count up before both tripping itself to start counting again and also engaging the cam followers of the refuel drive means to the refuel cams or otherwise initiating the refuel cycle by engaging the drive means to drive the refuel mechanism and subsequently the reload mechanism. These drive means are to be initiated at the proper time in the engine cycle, as already described earlier, and are to assure that only a single refuel cycle occurs for each engine cylinder with each refuel interval, and these requirements can be met by methods already known in the art of drive means. With this refuel interval control scheme, the frequency of refueling is increased by shortening the refuel interval whenever more char fuel is needed in the combustion chamber, as when the intake air density increases, or when the ash level is too close to the refuel end. Correspondingly, the refuel interval is lengthened whenever less char fuel is needed in the combustion chamber.

A schematic diagram of an electrical refuel interval control scheme is shown in FIG. 11 and comprises a control device, 218, receiving as inputs an electrical signal from an ash level sensor, 219, and an electrical signal from an intake air density sensor, 105, and sending as output an electrical signal of the number of engine revolutions, N, to which the revolution counter, 106, shall count engine revolutions from the crankshaft, 107, before both tripping itself to start counting engine revolutions again and also engaging the cam followers of the refuel drive means to the refuel cams, as, for example, by energizing the solenoid, 108, which then moves the refuel interval cam follower, 91, to engage the moveable refuel drive cam follower, 80, of the FIG. 8 and 9 form or refuel drive means. For this example, the solenoid, 108, substitutes for the refuel interval cam, 86, of the FIG. 8 and 9 form of refuel drive means. Electrical power can be supplied to the control device, 218, and the revolution counter, 106, via the power supply connections, 109 and 110.

1. Ash Removal Mechanism:

The ash removal mechanism is a means for removing ashes from the combustion chamber and dumping these ashes outside the engine and also for sealing the ash removal end of the combustion chamber against gas leakage during all engine compression and expansion processes. The ashes can be thusly removed from the combustion chamber either as molten ash or as dry ash powder and either in batches at intervals of engine running or essentially continuously if the ash is molten. As discussed in reference D, ash fusion temperatures vary with the char fuel origin and also with the type of gas atmosphere in which formed. For coal and coal derived char, ash fusion temperatures commonly lie between about 2,200° F. and 2,700° F. and thus for molten ash removal, the ash bin and the ash removal region of the combustion chamber should be kept at a temperature above about 2,700°F. The ash fusion temperature is usually not a sharply defined point and at temperatures below the fusion temperaturee, the ash may be a pasty mix of partly solid and partly liquid ash materials. Preferably, this pasty state of the ash is avoided as likely to create klinkers difficult to remove. Thus, for dry ash removal, the ash bin and the ash removal region of the combustion chamber should be kept at a temperature below about 2,000° F. For some coals and for char fuels of other origins, the desired ash bin temperatures may differ from the above approximate values.

The operating temperature of the ash bin and the ash removal end of the combustion chamber depends partly on the average gas temperature of the gaseous engine working fluid, partly on the extent of insulation or cooling provided at the ash removal end, and partly on the kinds of gases actually reaching the ash removal end of the combustion chamber. For molten ash removal, the needed high ash bin temperatures can be secured by insulating the ash removal end of the combustion chamber and/or by using non-porous combustion chamber walls at the ash removal end so that only the hot gases which have passed through burning char reach the ash removal end of the combustion chamber. For dry ash removal the needed low ash bin temperatures can be secured by improved cooling of the ash removal end of the combustion chamber and/or by using porous combustion chamber walls at the ash removal end so that cold compression air also reaches the ash removal end of the combustion chamber. Deliberate addition of selected extra ash materials to the fresh char fuel can be used to either increase or decrease the net ash fusion and softening temperatures in order to accommodate otherwise unuseable fuels to a particular engine. These ash melting control additives could be introduced into the fuel in various ways, as, for example, into the hopper of the reload mechanism.

With batch removal of ashes the weight of ashes removed, rwa, at each interval of na engine revolutions is given by the following approximate relation where air alone is used:

$$(rwa) = 0.175(da)(G)(VD)(na)(\% \text{ Ash}/100)$$

The ash bin available removal volume needs to be at least large enough to contain the largest quantity, rwa, created at maximum useable engine intake air density, da, and maximum expected fuel ash content, % Ash. Since engine torque is controlled via control of intake air density, da, we can either remove an essentially constant ash quantity, rwa, at adjustable ash removal intervals, na, or remove a variable ash quantity, rwa, at fixed ash removal intervals, na. Many different schemes for batch removal of ashes can be used and two example schemes will be described herein without intending to limit the invention to these described schemes. The example ash removal mechanism shown partially in FIG. 1 comprises an ash removal block, 55, fitted with an ash removal piston, 6, and cylinder, 60, and primary gas sealing means, 56. When the engine is to use a multicycle ash removal drive means, the ash removal block, 55, is additionally fitted with secondary sealing means, 57, for sealing the ash removal end, 7, of the combustion chamber, 1, when ash removal is occurring with the ash removal piston not aligned with the combustion chamber. Alternatively, the sealing means, 56, can be mounted into the engine cylinder surface, as shown for example in FIGS. 13 and 19, and thus perform the sealing function for both positions of the ash removal block. The ash removal drive means acts on the ash removal block, 55, at the connection point, 58, and on the ash removal piston, 6, at the connection point, 59, to drive the ash removal mechanism through the ash removal cycle at the end of each ash removal interval, na, of engine revolutions. When the engine is running and ash removal is not taking place, the ash removal piston, 6, the ash removal cylinder, 60, and the primary gas sealing means, 56, are aligned with the ash removal end, 7, of the combustion chamber, 1, as shown in FIG. 1, and in this position the ash removal piston, 6, is not acted upon via connection, 59, by the ash removal drive means but is instead free to move toward the combustion chamber, 1, under the action of the spring, 61. Engine cylinder gas pressures are essentially balanced on both sides of the ash removal piston, 6, via the gas pressure balancing passage, 62, and leakage minimized by the packing gland, 63. As combustion continues and burned up char is periodically replaced by fresh char from the refuel end, 5, of the combustion chamber, 1, the ashes are pushed along toward the ash removal end, 7, and here gradually displace the ash removal piston, 6, away from the combustion chamber against the force of the spring, 61. At the end of the ash removal interval, the ash removal drive means drives the ash removal block, 55, and the ash removal piston, 6, through the ash removal cycle consisting of the following events occurring in sequence as listed:

1. The ash removal drive means is engaged to the drive connection, 59, of the ash removal piston, 6, and then retracts this piston fully away from the combustion chamber.
2. The ash removal block, 55, is moved over so that the ash removal piston, 6, and cylinder, 60, are clear of the engine and aligned to the ash dump.
3. The ash removal piston, 6, is pushed fully through the ash cylinder, 60, in order to push all ash materials out of the cylinder and into the ash dump.
4. The ash removal piston, 6, is pulled back to the fully retracted position.
5. The ash removal block, 55, is moved back so that the ash removal piston, 6, and cylinder, 60, are aligned with the ash removal end, 7, of the combustion chamber, 1.
6. The ash removal piston, 6, is disengaged from the drive means and is again pressed toward the combustion chamber by the spring, 61.

At the end of this ash removal cycle, the ash removal mechanism is restored to its original situation and is ready to go through the next such cycle at the end of the next ash removal interval of na engine revolutions. Just as for the refuel mechanism drive means the ash removal drive means can be either single cycle or multi cycle. For a single cycle ash removal drive means, the ash removal cycle is carried out during a single engine exhaust and intake process. For a multicycle ash removal drive means, the first two steps, 1 and 2, of the ash removal cycle are preferably carried out during a single engine exhaust and intake process and similarly the last two steps, 5 and 6, are preferably carried out during a single engine exhaust and intake process. For a multicycle ash removal drive means secondary gas sealing means, 57, are used to seal the ash removal end of the combustion chamber while the ashes are being dumped. Suitable guideways, not shown in FIG. 1, can be used to hold the ash removal block, 55, securely against the sliding surface, 64, against the unseating force due to engine combustion chamber pressures, and to guide the ash removal block back and forth through the ash removal cycle. The ash removal block, 55, shown in FIG. 1, has linear motion through the ash removal cycle but other arrangements and motions of the ash removal block are also useable, as, for example, rotary motion about a centerline normal to the sliding surface, 64.

The ash removal drive means is a means for driving the ash removal mechanism through the ash removal cycle at each ash removal interval so that ash removal block motion takes place preferably only during engine intake and exhaust processes and so that the ash removal end of the combustion chamber is sealed against gas leakage during all engine compression and expansion processes. The ash removal drive means can comprise engine driven cams, cam followers and suitable linkage and either single speed or dual speed drive means can be used as described hereinabove for the refuel drive means. Hydraulic or hydraulic assisted drive means as well as electric motor or pneumatic drive means can also be used.

One mechanically rather simple scheme for batch removal of ashes employs a fixed ash removal interval, na, and whatever ashes are in the ash removal cylinder, 60, are removed and dumped at these intervals. As discussed in reference D, coal commonly has an ash content between about 5% and 20%, but higher ash contents are known and wood or charcoal may have ash contents of 1% or less. A short, fixed ash removal interval, na, allows use of fuels with a wide spread in ash content but requires a large number of ash removal cycles whereas a long fixed interval, na, reduces the number of cycles but limits the useable fuel ash content or requires a large available ash volume in the ash removal cylinder, 60. Particular flexibility results when batch removal of ashes occurs at ash removal intervals, na, equal to the refuel interval, N, and the maximum available ash removal volume equals the maximum refuel volume, and further the first stroke of the ash removal cycle occurs concurrently with the refuel stroke of placing fresh char fuel into the combustion chamber. With this particular arrangement, fuels of any ash content can be accommodated.

Another scheme for batch removal of ashes employs a fixed ash removal quantity, rwa, and the ash removal interval, na, is varied in order to empty the ash removal cylinder, 60, whenever it has filled to a certain point. As the ashes accumulate, the ash removal piston, 6, is gradually displaced away from the combustion chamber and when this displacement reaches the selected value of ash removal quantity, the ash removal piston or a linkage connected thereto can act via an electrical switch or a mechanical trip linkage to engage the ash removal drive means to carry out an ash removal cycle. The trip linkage is arranged to engage the ash removal drive means only during that part of the engine cycle prior to the start of an ash removal cycle, thus assuring that a complete cycle but only one complete cycle of ash removal is carried out. Various types of trip devices and linkages can be used for this purpose as are already well known in the art. This variable ash removal interval scheme has the advantage of ready accommodation to widely varying fuel ash content and the disadvantage of greater mechanical complexity.

These two batch ash removal schemes described above can be used with refuel mechanisms which maintain an approximately fixed location of the ash level in the combustion chamber by controlling either the refuel quantity, rwc, or the refuel interval, N. The above de-. scribed two ash removal schemes cannot properly be used with a spring loaded or hydraulic pressure loaded refuel piston wherein the refuel quantity, rwc, is to be set by completely refilling the combustion chamber.

Char volume sensors and controls can also be used as ash level sensors and controls for setting refuel quantity, for setting refuel interval, or for setting ash removal interval. As char volume decreases due to burnup, on a dual process engine, exhaust gas oxygen content rises, exhaust gas temperature decreases, exhaust gas carbon dioxide content decreases and the ratio of the torque output to intake manifold absolute pressure decreases. For a unit process engine exhaust gas carbon dioxide content increases as char volume decreases. Any of these quantities which vary with char volume can be sensed with suitable sensors and the sensor output can act via a control device to either increase refuel quantity or decrease refuel interval or shorten ash removal interval as suitable for the engine control scheme being used.

The ash removal interval can be set to occur whenever the char volume sensor indicates that the char volume is becoming inadequate to react fully with the available oxygen. A fixed and large volume of ashes can be removed at this ash removal interval and thereafter the char volume will be adequate until near the end of the next ash removal interval. The ash removal volume can be hand adjusted, if desired, to accommodate char fuels of different ash contents and further adjusted in response to chemical analyses of the unburned carbon content of the removed ashes. An example of this scheme is shown schematically in FIG. 19 and comprises an exhaust gas oxygen content sensor, 169, a control circuit, 170, which energizes the solenoid, 171, whenever exhaust oxygen content rises due to a deficiency of char quantity. When energized, the solenoid, 171, acts to engage the ash removal drive means, as via the ash removal interval cam follower, 91, of the FIGS. 8 and 9 form of ash removal drive means. The ash removal drive means then acts via the connection, 58, and the connection, 59, to drive the ash removal block, 55, and ash removal piston, 6, through one complete ash removal cycle. With this scheme, the ash removal piston, 6, can occupy a fixed position, as shown in FIG. 19, within the ash removal cylinder, 60, at all times except during an ash removal cycle.

Where the ashes are kept molten in the combustion chamber, an essentially continuous bleeding out of the ashes can be used, as for example is shown in FIG. 7. The engine combustion chamber, 1, is arranged vertically so the liquid ashes will flow downward to the ash valve, 65, which can seat and seal against the ash valve seat, 66, and these elements are made of high temperature materials such as ceramics. When little or no molten ash is at the ash valve, it is seated and gas leakage sealed against the ash valve seat, by engine cylinder gas pressures acting on the differential area of the valve head, and by refuelling forces. When molten ash has accumulated around the ash valve, 65, it will float open, since the head is hollowed out to make it lighter than molten ash, and molten ashes will flow out of the combustion chamber, 1, and be deflected away from the valve guide, 67, by the skirt, 68. A more positive and assured opening of the ash valve, 65, can be obtained by also spring loading the ash valve stem, 69, in the opening direction. Hence, the ash valve will be open and bleeding out molten ashes only when there are ashes to be removed and in this way gas leakage via the ash valve is prevented and the ash level is maintained approximately constant. When the engine is to be stopped, it is necessary to blow down the molten ashes from the combustion chamber and to keep the ash valve open until the engine is again started up to avoid freezing up the molten ashes inside the engine. This blowdown and valve opening can be readily accomplished by a hand or automatically actuated lever, 172, which fully opens the ash valve, 65, several engine cycles before stopping and holds the valve thusly open so that the high cylinder gas pressures blow down the molten ashes out of the combustion chamber, and the ash valve remains open until the next starting. This molten ash removal scheme has the advantages of simplicity, ready handling of varying fuel ash content, and maintenance of an approximately fixed ash level without the need of ash level sensors. When used with a spring or hydraulic pressure loaded refuel piston and pelletized or crushed char fuel, a preferred combination results of great mechanical simplicity and ease of control.

If the ash valve seat, 66, is fixed with respect to the combustion chamber, 1, as shown in FIG. 7, briquetted fuel cannot be used with the above described molten ash removal scheme. This limitation can be avoided by making the ash valve seat, 66, and the ash bin end of the combustion chamber moveable along the combustion chamber axis so that briquettes can be accommodated without mechanical interference. The moveable ash bin ash valve seat are then spring loaded and cylinder gas pressure balanced. In this form the ash bin position relative to the combustion chamber can be used as a mechanical ash level sensor to control the refuel quantity, rwc, or the refuel interval, N, as explained hereinabove for the similarly moveable grate of FIG. 16.

A continuous molten ash bleed via a small orifice, without an ash valve, can also be used and is mechanically simple. With low ash content fuels gas leakage may occur via the ash bleed orifice but this condition can be corrected by deliberate addition of ash constituents into the char fuel in order to maintain sufficient molten ash inside the combustion chamber as to gas seal the ash bleed orifice. An ash level sensor can be used to control the quantity of ash material to be thus deliberately added. For engine stopping a low ash fuel is used until the ash bleed orifice has fully blown down the molten ashes.

Where the char fuel is placed in containers or cannisters of fixed volume, or where an inert porous carrier is used to carry an oil fuel, the refuel stroke of placing fuel into the combustion chamber must occur concurrently with the cannister or container removal stroke of the ash removal cycle, and, additionally, the refuel piston stroke must equal the ash removal piston stroke in order to avoid mechanical interference. Hence, the ash removal interval, na, is equal to the refuel interval, N. If the cannisters are preloaded with a fixed refuel quantity, rwc, the refuel interval, N, and hence also the ash removal interval, na, are to be controlled, to hold ash level approximately fixed in the combustion chamber, via an ash level sensor and control scheme as described hereinabove. One additional example of an ash sensor device, particularly suitable for use with cannisters whose end facing the ash removal end of the combustion chamber is open, is a separate ash sensor bar or piston extensible from the ash removal piston towards the combustion chamber. This ash sensor bar can sense thermally or mechanically when char burnup is completed in that last cannister next to the ash removal piston and this sensing signal can act via a control device to initiate both a refuel cycle and an ash removal cycle together.

The position of the ash zone within the combustion chamber can alternatively be determined by placing a grate, 174, within the combustion chamber, 1, toward the ash removal end, 7, as shown, for example, in FIG. 15, which effectively separates the regions of burning char from the regions of ash by allowing essentially only ash to pass through the grate. This separating action of the grate may be satisfactory when agglomerating or "caking" type char fuels are used. However, when completely non-agglomerating char fuels are used, this separating action may not be satisfactory and appreciable quantities of unburned char fuel may pass through the grates into the ash region. Where the grate is fixed to the combustion chamber wall, it is necessary to use a spring loaded or hydraulically loaded refuel piston with pelletized or crushed char fuel and briquettes cannot be used. If briquettes are to be used, the grate can be made moveable along the direction of refueling and is preferably spring loaded against the refuel force. One example of such a moveable grate scheme is shown in FIG. 16, wherein the moveable grate, 142, is pressed into the combustion chamber, 1, by the grate sleeve, 143, loaded by the spring, 144. During ash removal the grate sleeve, 143, is retracted by the ash piston, 6, and the stops, 145, 146, to be flush with or retracted from the surface, 64, to avoid mechanical interference. The back-and-forth movement of this spring loaded, moveable grate may improve the separating effectiveness of the grate by shaking the ashes out of the adjacent burning mass. This spring loaded, moveable grate can also be used as a mechanical ash level sensor to control the refuel quantity as by the sleeve, 143, and its extension, 173. Further improvement of separator action can be achieved by shaking or vibrating the grate via external drive means but mechanical complexity is then greatly increased.

When fuels of essentially zero ash content are to be used, an ash removal mechanism is not needed, but then an engine so designed can only use such fuels which are in very limited supply. On the other hand, an engine equipped with an ash removal mechanism will likely experience problems when burning zero or very low ash content fuels. For example, gas sealing problems may occur with continuous molten ash bleed engines when zero ash fuels are used. Control problems are likely when zero ash fuels are burned in engines using ash level sensors to control refuel quantity. These difficulties with zero or low ash content fuels are most easily solved by deliberately adding ash ingredients into the char fuel. If necessary, these added ash ingredients can be recycled from the ash removal mechanism back into the reload mechanism.

Applications of char burning engines may also occur where it is desired to only burn the char fuel partially while within the engine and in this case partially burned char fuel as coke will be removed from the engine by the ash removal mechanism. Such partially burned char fuel may be preferred in some other uses, such as for metallurgical coke, since partial burning tends to reduce coke sulfur content due to preferential sulfur oxidation. For this coke making application, the same kinds of refuel mechanisms, reload mechanisms and ash removal mechanisms as described hereinabove can be used but these mechanisms need to be designed, operated, and controlled to deliver larger quantities both into and out of the char burning engine combustion chamber. Ash zone level control of either refuel or ash removal can no longer be used since an ash zone is not formed. Coke can be thusly produced by refueling more char fuel than the engine is burning, this excess being then removed as coke by the ash removal mechanism. As coke production is thusly increased, relative to char fuel burnup, the char remains a shorter time within the engine combustion chamber and an increasing portion of the char fuel therein is colder than its rapid burning temperature. Hence, eventually engine torque must decrease when the volume of char fuel at rapid burning temperatures is inadequate, within the engine combustion chamber, to fully utilize the available oxygen. Ordinarily, this torque decrease point would represent the maximum coke production capacity of the engine. This maximum coke capacity must be determined experimentally since it depends upon the char properties such as the thermal conductivity, volatile matter content and the rapid burn temperature of the char fuel and these vary as between different fuels. Any coke production rate can then be used between none and this maximum coke capacity.

Various combinations of refuel mechanism, reload mechanism, and ash removal mechanism as described hereinabove, can be used for coke production and various control methods can be used of which hand control is the simplest. For example, a fixed volume ash removal mechanism can be used with refilling refuel and reload mechanisms and the coke production rate can be increased by hand shortening the ash removal interval and vice versa. Alternatively, a fixed ash removal interval can be used with the volume of the ash removal mechanism being hand adjusted to adjust coke production rate. For these cases with refilling refuel and reload mechanisms refuel occurs preferably after each ash removal process. Where a refuel quantity control is used with an adjustable volume ash removal mechanism, the refuel quantity can be increased by hand adjustment of the refuel and/or reload mechanism and coke will be then removed by the ash removal mechanism in proportion as refuel quantity exceeds char burnup within the engine cylinder.

Many different kinds of ash removal mechanisms can be used, of which several examples are described hereinabove, and these can be used in various combinations with the many different kinds of refuel mechanisms and control schemes. Certain combinations of ash removal mechanism, refuel mechanism, and control scheme cannot, however, be used due to mechanical interference problems or control problems or other problems. Some of these unuseable combinations have already been described hereinabove. For example, briquetted fuel and a briquette refuel mechanism cannot be used with any of those ash removal mechanisms of fixed position such as the fixed molten ash bleed valve scheme. Similarly, unuseable are combinations of fixed position ash removal mechanisms with refuel mechanisms wherein refuel quantity is controlled in order to control ash zone level.

Starting:

To start the char burning engine requires that a portion of the char fuel in the engine combustion chamber be heated to a temperature at which char will react rapidly with oxygen in the adjacent compressed air, and that the engine be cranked to start. Rapid reaction temperatures vary between different chars and are influenced by catalysts accidentally present or deliberately added, but practically all chars will react rapidly with air at temperatures of about 1000° F. or greater as shown, for example, in references D, E and F. If the entire volume of char fuel within the engine combustion chamber is heated to the rapid reaction temperature, the engine will start almost immediately, cranking commences and can develop full torque very shortly thereafter, and this may be preferred for engines requied to start up and load quickly. For many engine applications, more leisurely startup and loading are satisfactory and for these engines only a portion of the char fuel need be heated up to the rapid reaction temperature. Once cranking has commenced, the rapid reaction of the heated char portion will further elevate its own temperature, heat up adjacent char to the rapid reaction temperature, and generate some engine power to assist engine cranking. As the heated portion thus spreads by char reaction and heat transfer, the engine power developed increases until the engine becomes self cranking and is then started. Thereafter, the continued spread of the heated and rapidly reacting portion increases available engine torque until finally the engine is capable of developing full torque and is ready for use. The larger the portion of char fuel initially heated up to the rapid reaction temperature, the shorter becomes the pre-start cranking time and the more quickly the engine becomes ready for loading.

Any external power source can be used for the pre-start cranking of the engine, such as electric motors with batteries, compressed air, inertia starters, spring starters, etc., using suitable means for engagement and disengagement of the external power source, as is already well known in the art of starting internal combustion engines.

Several means for heating a portion of the char fuel in the engine combustion chamber for starting can be used as, for example, the following:

A. The engine can be equipped with a diesel fuel injector and fuel system and is first started as a diesel engine at rather lean overall fuel-air ratios. During the pressure rise caused by burning of the diesel fuel, hot oxygen will be forced into the pores of the char fuel to heat it up and eventually start the char burning rapidly. When the char is capable of rapid burning, the diesel fuel can be turned off and the engine then run on the char fuel. This diesel starting engine can also be run subsequently on char alone, on diesel fuel alone or on both fuels at the same time and this fuel flexibility is an added advantage for certain engine applications.

B. A modification of the foregoing diesel engine starting method is to wet down a portion of the char fuel with diesel fuel and the compression ignition of this diesel fuel portion when in the combustion chamber will accomplish the same char heating purposes as the conventional diesel injector as described above. Easier starting can be obtained by use of very high cetane number diesel fuels. The wetting down can be done with a spray nozzle located, for example, in the refuel piston head, which wets down adjacent char fuel during starting, and this can be done with a low pressure spray nozzle since fine atomization is not needed. Alternatively, the char fuel can be wet down outside the engine, as, for example, in the reload mechanism and the wetted down char then passed into the combustion chamber on the next refuel cycle. This wetted char scheme also can be used subsequently for continued engine running on dual fuels. One example of such a char wetting scheme for engine starting is shown in FIG. 13 whose operation is explained hereinafter as also an example of a scheme for normal running of the engine in whole or part on oil fuels.

C. The engine is equipped with a gasoline or gas fuel carburator and ignition system and is first started as a spark ignition engine at as lean an overall fuel-air ratio as possible (circa 18 or 20 to 1 lbs. of air per lb. of fuel). The starting scheme is essentially similar to that described above for the diesel starting engine and the advantage of multifuel capability is also available with this gas starting engine.

D. The combustion chamber for the solid char fuel can be equipped with electrodes so that an electric heating current can be passed through the conductive char to heat it up while the engine is being cranked over. Either DC or AC of adequate voltage can be applied across the char electrodes while the engine is being cranked. Where only storage batteries are available for both cranking and char heating, an inductive energy storage and release circuit, essentially similar to the typical automotive ignition circuit, can be used for the char heating with the coil built large enough to store adequate energy for release across the char volume.

E. Intake air heaters, either electric or fuel fired, can be used to achieve high intake air temperatures and much higher compressed air temperatures inside the engine cylinder. This high temperature compressed air will rapidly heat up the char while being forced into the char pores during the compression stroke while cranking. These intake air heaters would then preferably be turned off once the char was burning rapidly and the engine was running.

F. Getting the char to start burning may also be assisted by use of special "starting char" fuel which can be specially prepared with carbon oxidation catalysts, as, for example, various salts of metals such as copper, iron, lead, thallium, manganese, etc. Metallic aluminum and/or magnesium particles could also be mixed in with the "starting char," not only to increase electrical conductivity but also to more rapidly heat up the char by their own burning.

G. Some chars, such as wood charcoal, have very low rapid reaction temperatures and engine cranking alone may be adequate to get the engine started without need of auxiliary char heating means.

Combustion of these and other starting methods can also be used for the starting of these char burning engines.

Stopping:

To stop these char burning engines requires that the burning reaction between char and oxygen be arrested or at least greatly slowed down. The char and oxygen reaction can be slowed down or arrested by removing the char from the combustion chamber, by removal or reduction of the oxygen content of the engine intake gases, by chilling the char mass well below its rapid reaction temperature by use of excess steam; by use of chemical fire retardants, and by combinations of these means. A preferred means for stopping the engine is to connect the engine intake pipe to the engine exhaust pipe, thus greatly reducing the oxygen content of the engine intake gases, and the engine will then stop running. An example of such an exhaust gas recirculation system for engine stopping is shown in FIG. 12 comprising an intake selector valve, 175, with handle, 175, an exhaust selector valve, 177, with handle, 178, and a crossover pipe, 179, connecting between the intake selector valve, 175, and the exhaust selector valve, 177. For normal engine running, these selector valves, 175, 177, are positioned as shown in solid outline in FIG. 12, and engine exhaust gas from the engine exhaust pipe, 71, passes via the pipe, 180, through the exhaust bypass valve, 181, to the gas turbine, 182, which drives the intake air supercharger, 183, and is discharged via the pipe, 186, whereas the intake air entering the supercharger, 183, via the pipe, 184, passes from the supercharger through the throttle valve, 185, and into the engine intake air port, 70. When the engine is to be stopped, the selector valves, 175, 177, are moved by the handles 176, 178, into the positions shown in dashed outline in FIG. 12, and engine exhaust gas from the engine exhuast pipe, 71, passes via the crossover pipe, 179, into the engine intake air port, 70, and the engine stops since almost no oxygen will then be present in the cylinder gases. Another preferred means for stopping the engine is to reduce the intake air density, da, by an intake manifold throttle, sufficiently that the engine torque developed is inadequate to overcome the friction of the engine itself which then stops. After the engine has stopped, it may be desirable to continue circulation of the engine jacket coolant until the originally very hot char mass has cooled down sufficiently.

Torque Control:

When this char burning engine has been started and is running normally, engine torque can be controlled most easily by control of engine intake air density, da. Engine intake air density, da, can be controlled by use of an air intake throttle, or by use of an adjustable supercharger, or by use of a throttle and supercharger in combination as is well known in the art of internal combustion engines. An example of an intake air density control scheme is shown in FIG. 12 wherein the engine exhaust gas driven gas turbine, 182, drives the intake air supercharger, 183, and intake air density can be controlled by controlling the portion of exhaust gas passing through the gas turbine, 182, by adjusting the exhaust bypass valve, 181. As less exhaust gas passes through the turbine, 182, both it and the supercharger, 183, do less work resulting in a reduced supercharge pressure and hence air density at the engine intake air port, 70. After all exhaust gas is bypassed away from the turbine, 182, by the bypass valve, 181, still further reductions of intake air pressure and hence density can be accomplished, if needed, by restricting intake air flow using the throttle valve, 185.

Combination Fuels:

The char and oil burning engines of this invention are not only capable of burning said char fuels, a fuel heretofore unuseable for internal combustion engines, but additionally can burn oil-soaked char fuels and oil-soaked inert pellets. These two latter oil-based char engine fuels may be particularly useful for use in transport applications when areas are entered where coal char fuels are not readily available. Preferred oils for these applications are residual type materials, heavy tars, asphalts, and slurries of oil and char fuel as they will yield appreciable coke or char type material when burning commences in the engine combustion chamber.

When inert pellets are used as an oil carrier for the char fuel, these are to be made of a high temperature material, such as a porous ceramic. Since the volume of these inert pellets is not appreciably changed by combustion, the engine refuel and ash removal mechanisms must be of the essentially equal volume type as described hereinabove for cannisters. The refuel interval, N, is preferably constant, however, since the refuel quantity of oil is more easily controlled separately from the refuel and ash removal processes. The inert pellets can be recycled back from the ash removal mechanism into the reload mechanism via any suitable means for recycling which is external to the engine combustion chamber. Preferably, the refuel quantity of oil, rwo, is poured onto the inert pellets, or onto other char fuel if used, during engine intake or early in the compression stroke at the latest. In this way, the liquid fuel is forced deeply into the pores during compression and the needed large area of fuel is thusly created. The refuel quantity of oil may also be placed on the inert pellets or other char fuel outside the engine as, for example, within the refuel mechanism or within the reload mechanism. For engines using the diesel fuel starting means, the oil fuel can be sprayed onto the inert pellets or other char fuel via this diesel fuel starting spray nozzle.

Where oil fuel is used alone on inert pellets, the refuel quantity of oil, rwo, can be separately metered and controlled and is given by the following approximate relation where air alone is used:

$$rwo = (0.714)(da)(VD)(N)(U)$$

Wherein the air utilization factor, U, is the proportion of the engine air actually used in the combustion of the oil and is similar to the pore reaction ratio, G, but allows for combustion of volatile matter and evolved gases. This air utilization factor, U, depends, as does G, upon the combustion chamber geometry and the pores volume, and additionally depends upon the fuel volatile matter content, but is very nearly a constant for a particular engine using a particular fuel. With the preferred constant refuel interval, N, we want to control refuel quantity of oil, rwo, in direct proportion to engine intake air density, da, and the various refuel quantity control schemes described hereinabove can be used for this purpose. This refuel quantity control device can act on the oil fuel delivery pump to control the refeul quantity of oil, rwo, by various methods already well known in the art of liquid fuel pumps.

One particular example of an oil pouring arrangement is shown in FIG. 13 and is suitable for use of oil fuel alone on porous inert pellets or cartridges, or oil fuel on porous char fuels, and also as a starting means for char fueled engines. An oil fuel metering pump, 187, is mounted on the refuel block, 8, and is driven to pump by the linear cam, 188, and pump cam follower, 189, and is driven to return suction by the spring, 190, the fuel so pumped being delivered by the pour nozzle, 191, onto the char fuel or inert cartridges, 192. The refuel quantity of oil, rwo, is controlled by the pump quantity control, 193. Fuel oil is supplied to the pump, 187, via the flexible pipe, 194, and fuel selector valve, 195, which allows use of fuel oil via pipe, 196, for normal engine running, or use of a special starting fuel via pipe, 197, for engine starting. Preferably, the pumping ramp, 198, of the linear cam, 188, is located and proportioned so that the pour nozzle, 191, pours fuel oil only onto the char fuel, 192, and across the surface thereof, as the refuel block, 8, is finishing its motion during each refuel cycle.

Moveable Combustion Chambers:

A set of at least two moveable combustion chambers can alternatively be used instead of the fixed combustion chamber scheme. For example, two combustion chambers could be mounted in a moveable chamber block for each engine cylinder. The chamber block would then be aligned so that, while one combustion chamber was open to the engine cylinder gases and undergoing burning, the other combustion chamber was being refueled and having ashes removed. Subsequently, the chamber block would be moved by a drive means so that the two combustion chambers exchanged these functions. Various motion patterns of the moveable chamber block could be used such as rotary motion, linear motion, or combinations thereof. A drive means is needed to drive this moveable combustion chamber block through its cycle. Various types of drive means can be used such as, mechanical cams and followers and linkage, hydraulic or pneumatic drive with cam-actuated valves, etc. Preferably, the actuating cams are driven at a speed reduced in an integral ratio from engine crankshaft or camshaft speed and are timed relative to the crankshaft so that motion of a moveable chamber block occurs only during an exhaust and intake process of that engine cylinder. Thus, motion of the moveable chamber block occurs at intervals of an integral number of engine crankshaft revolutions. This motion interval can be fixed, and then refuel quantity and ash removal quantity may be varied. Alternatively, this motion interval can be adjustable and any of the ash level sensor schemes described herein can be used to adjust the motion interval so that best oxygen utilization is achieved and so that best char burning results. Refueling and ash removal are to occur only when the moveable chamber block is stationary. Means for sealing against gas leakage are needed between the engine cylinder and the moveable chamber block and seals suitable for this purpose are already well known in the art. Any of the ash level sensor schemes described hereinabove can be used, with a suitable control device, to initiate the motion of the moveable combustion chamber block, as by engaging the moveable chamber drive means. One advantage of this moveable combustion chamber scheme is that the refuel block and the ash removal block can be stationary. Alternatively, the refuel and ash removal blocks can be stationary during the refuel and ash removal processes but can then be moved on to another engine cylinder so that a single refuel mechanism and a single ash removal mechanism can serve several cylinders of a multicylinder engine. A further advantage of the moveable combustion chamber scheme is that the refuel and ash removal processes can take place at ambient pressures and in a leisurely manner with consequently reduced inertia forces in these mechanisms. A disadvantage of this movable combustion chamber scheme is that heat losses from the combustion chamber will be increased by the presence of the extra chamber being refueled and having ashes removed. For this reason, the time interval that a combustion chamber remains outside the engine cylinder must be limited to avoid chilling the char fuel therein to below its rapid burning temperature.

One particular example of a moveable combustion chamber scheme is shown in FIG. 10 and comprises two combustion chambers, 95 and 96, mounted in the moveable chamber block 97. As shown in FIG. 10 the combustion chamber, 95, is positioned inside the engine cylinder, 3, and char burning will occur in this combustion chamber when the piston, 2, rises during compression. The other combustion chamber, 96, is positioned outside the engine cylinder and aligned with a refuel mechansm, 98, and an ash removal mechanism, 99, whose details are not shown in FIG. 10. After the end of a motion interval, the moveable chamber block, 97, is then moved via the connection, 100, by the chamber block drive means so that the combustion chamber 96, is inside the engine cylinder, 3, and so that the combustion chamber, 95, is outside the engine cylinder and aligned with a refuel mechanism, 101, and an ash removal mechanism, 102. Refuel and ash removal occur only while the moveable chamber block, 97, is stationary. Sealing means, 103 and 104, prevent gas leakage. Various kinds of drive means can be used to drive the moveable chamber block via the connection, 100, such as described herein for refuel drive means and ash removal drive means, and these drive means can be single speed or dual speed drive means, but are preferably single cycle drive means. A ceramic shield, 109, keeps char fuel ashes from reaching the engine piston, 2.

Preferred Use of Steam:

Preferably, steam is admitted only during compression and in a stratified manner. Such a preferred engine steam stratifier admits steam equally to each engine cylinder at that time in the compression process and at that position in the engine cylinder which puts this admitted steam largely into that air mass which is forced inside the carbon pore spaces of the combustion chamber during the compression process. In this way, excess unreacted steam is minimized. An engine steam stratifier device comprises a means for supplying steam and a means for properly delivering the steam into each engine cylinder. Various kinds of supply means and delivery means can be used, and additional elements may also be used, such as a scheme to control steam air ratios. Often a single engine steam stratifier device will suffice for a single char burning internal combustion engine. Two or more engine steam stratifier devices may be used on a single char burning internal combustion engine in some applications, as, for example, in engines using two or more separated combustion chambers.

Various schemes for supplying and delivering steam into an engine cylinder are described in my cross-referenced related application entitled, "Engine Steam Stratifier," Ser. No. 06/148401, filing date 9 May 1980, and this descriptive material is incorporated herein by reference thereto.

Various specific forms of char and oil burning engine have been described hereinabove as examples to illustrate various features of these engines, but is not intended to limit the invention to these examples.

Having thus described my invention, what I claim is:

1. A char burning engine comprising:
    an internal combustion engine mechanism, comprising at least one cylinder with pistons operative therein;
    a combustion chamber comprising: means for containing char fuel and ashes, so that said char fuel and ashes are mechanically separated from the piston and cylinder of the engine, said means for containing having a refuel end, with passages through said means for containing char fuel and ashes, so that air can flow readily into said char fuel during engine compression, and so that gases can flow readily out of said char fuel during engine expansion, whereby combustion of said char fuel can occur within said means for containing char fuel and ashes, each cylinder of said internal combustion engine being equipped with at least one of said combustion chambers;
    means for sealing the refuel end of said means for containing char fuel and ashes through which refueling takes place, during engine compression and expansion processes, and for refueling fresh char fuel at intervals into said means for containig char fuel and ashes, said means being a refuel mechanism;
    means for reloading a quantity of fresh char fuel at intervals into said refuel mechanism;
    means for controlling the density of the engine intake air in order to control engine torque;
    whereby said internal combustion engine becomes a char burning engine capable of running on char fuels.

2. A char burning engine as described in claim 1, and further comprising:
    means for slowing down the reaction of char and oxygen when the engine is to be stopped.

3. A char burning engine as described in claim 2, and further comprising:
    means for heating a portion of the char fuel within said combustion chamber to that temperature at which char will react rapidly with oxygen in adjacent compressed air, so that the engine will start when cranked.

4. A char burning engine as described in claim 3, wherein a liquid fuel is used as said means for heating a portion of the char fuel and said liquid fuel can be used as a normal running fuel.

5. A char burning engine as described in claim 3, wherein said means for containing has an ash removal end; and further comprising:
    an ash removal mechanism comprising: means for removing a quantity of ashes from said combustion chamber; means for dumping said removed quantity of ashes outside the engine; means for sealing the ash removal end of said combustion chamber against gas leakage during compression and expansion processes of the engine.

6. A char burning engine as described in claim 5, and further comprising:
    means for mechanically separating burning char fuel from ashes.

7. A char burning engine as described in claim 5, and further comprising:
    means for mechanically separating burning char fuel from ashes, said means for mechanical separation being a fixed grate.

8. A char burning engine as described in claim 5, and further comprising:
    means for mechanically separating burning char fuel from ashes, said means for mechanical separation being a moveable grate.

9. A char burning engine as described in claim 3, wherein said means for containing has an ash removal end; and further comprising:
    an ash removal mechanism comprising; means for removing a quantity of ashes from said combustion chamber in the molten state; means for dumping said removed quantity of ashes outside the engine; means for sealing the ash removal end of said combustion chamber against gas leakage during compression and expansion processes of the engine; and further comprising:
    means for unsealing the gas leakage sealing means at the ash removal end of said combustion chamber when the engine is about to be stopped, so that ashes can be blown down out of said combustion chamber before the engine has stopped.

10. A char burning engine as described in claim 3, wherein said means for containing has an ash removal end; and further comprising:
    an ash removal mechanism comprising; means for removing a quantity of ashes from said combustion chamber at intervals; means for dumping said removed quantity of ashes outside the engine; means for sealing the ash removal end of said combustion chamber against gas leakage during compression and expansion processes of the engine.

11. A char burning engine comprising:
    an internal combustion engine mechanism comprising at least one cylinder with pistons operative therein;
    a combustion chamber comprising; means for containing char fuel and ashes so that said char fuel and ashes are mechanically separated from the piston and cylinder of the engine, said means for containing having a refuel end and an ash removal end, with passages through said means for containing char fuel and ashes, so that air can flow readily into said char fuel during engine compression and so that gases can flow readily out of said char fuel during engine expansion, whereby combustion of said char fuel can occur within said means for containing char fuel and ashes, each cylinder of said internal combustion engine being equipped with at least one of said combustion chambers;

a refuel mechanism comprising a refuel block and a refuel block drive;

said refuel block comprising: means for adding fresh char into said combustion chamber at intervals so that combustion chamber is filled at each refueling; and means for sealing the refuel end of said combustion chamber;

said refuel block drive comprising; means for driving said refuel block through a refuel cycle at the end of each refuel interval so that the refuel end of the combustion chamber is sealed during engine compression and expansion processes;

means for reloading a quantity of fresh char fuel at intervals into said refuel mechanism, said means for reloading a quantity of fresh char fuel being a reload mechanism, each char burning engine, whatever the number of engine cylinders, being equipped with at least one reload mechanism, and each cylinder of said engine being served by at least one reload mechanism;

an ash removal mechanism comprising; means for removing a quantity of ashes from said combustion chamber; means for dumping said removed quantity of ashes outside the engine; means for sealing the ash removal end of said combustion chamber against gas leakage during compression and expansion processes of the engine;

means for heating a portion of the char fuel within said combustion chamber to that temperature at which char will react rapidly with oxygen in adjacent compressed air so that the engine will start when cranked;

means for slowing down the reaction of char and oxygen when the engine is to be stopped;

means for controlling the density of the engine intake air in order to control engine torque;

whereby said internal combustion engine becomes a char burning engine capable of running on char fuels as well as on fuels used for said starting means.

12. A char burning engine as described in claim 11; wherein said refuel interval is a fixed integral number of engine revolutions;
wherein said ash removal mechanism removes ashes in the molten state and is fixed;
and further comprising;
means for unsealing the gas leakage sealing means at the ash removal end of said combustion chamber when the engine is about to be stopped so that ashes can be blown down out of said combustion chamber before the engine has stopped.

13. A char burning engine as described in claim 11; wherein said refuel interval is a fixed integral number of engine revolutions;
wherein said ash removal mechanism comprises an ash removal block and an ash removal block drive means;
said ash removal block comprising; means for removing a quantity of ashes from said combustion chamber at intervals, means for dumping said removed quantity of ashes outside the engine, means for sealing the ash removal end of said combustion chamber against gas leakage during compression and expansion processes of the engine;

said ash removal block drive means comprising; means for driving said ash removal block through an ash removal cycle at the end of each ash removal interval, so that the ash removal end of said combustion chamber is sealed against gas leakage during compression and expansion processes of the engine;

means for initiating said ash removal block drive means to drive said ash removal block through an ash removal cycle whenever a certain quantity of ashes is within said combustion chamber.

14. A char burning engine comprising:
an internal combustion engine mechanism comprising at least one cylinder with pistons operative therein;
a combustion chamber comprising: means for containing char fuel and ashes so that said char fuel and ashes are mechanically separated from the piston and cylinder of the engine, said means for containing having a refuel end and an ash removal end, with passage through said means for containing char fuel and ashes so that air can flow readily into said char fuel during engine compression and so that gases can flow readily out of said char fuel during engine expansion, whereby combustion of said char fuel can occur within said means for containing char fuel and ashes, each cylinder of said internal combustion engine being equipped with at least one of said combustion chambers;

a refuel mechanism comprising a refuel block and a refuel block drive;

said refuel block comprising; means for adding fresh char fuel into said combustion chamber at intervals, said means for adding fresh char fuel displacing a fixed volume at each refueling, said refuel interval being a fixed integral number of engine revolutions; and means for sealing the refuel end of said combustion chamber;

said refuel block drive comprising, means for driving said refuel block through a refuel cycle at the end of each refuel interval so that the refuel end of the combustion chamber is sealed during engine compression and expansion processes;

means for reloading a quantity of fresh char fuel at intervals into said refuel mechanism and adjusting the fresh char fuel quantity thusly reloaded to maintain a total char quantity within said engine combustion chamber adequate to assure essentially maximum possible reaction of the available oxygen with char fuel, and to assure essentially maximum possible reaction of the char fuel while within said combustion chamber, said means for reloading a quantity of fresh char fuel being a reload mechanism, each char burning engine, whatever the number of engine cylinders, being equipped with at least one reload mechanism, and each cylinder of said engine being served by at least one reload mechanism;

an ash removal mechanism comprising: means for removing a quantity of ashes from said combustion chamber; means for dumping said removed quantity of ashes outside the engine; means for sealing the ash removal end of said combustion chamber against gas leakage during compression and expansion processes of the engine;

means for heating a portion of the char fuel within said combustion chamber to that temperature at which char will react rapidly with oxygen in adjacent compressed air, so that the engine will start when cranked;

means for slowing down the reaction of char and oxygen when the engine is to be stopped;

means for controlling the density of the engine intake air in order to control engine torque;

whereby said internal combustion engine becomes a char burning engine capable of running on char fuels as well as on fuels used for said starting means.

15. A char burning engine as described in claim 14;

wherein said reload mechanism comprises a fuel charging mechanism, an air density sensor and control, and an ash level sensor and control;

said fuel charging mechanism comprising; means for transferring at intervals a set quantity of fresh char fuel from a fuel supply hopper into said refuel mechanism, setting the quantity of fresh char fuel so transferred, and processing the transferred fresh char fuel quantity;

said air density sensor and control comprising; means for sensing the engine intake air density and adjusting said quantity setting device of said fuel charging mechanism so that the quantity of fresh char fuel transferred at each reloading into said refuel mechanism is proportional to the density of the engine intake air;

said ash level sensor and control comprising: means for sensing the ash zone level within said combustion chamber and adjusting said quantity setting device of said fuel charging mechanism so that the ash zone level within said combustion chamber is deep enough within said combustion chamber to assure essentially maximum possible reaction of char fuel while within said combustion chamber and is low enough within said combustion chamber to assure essentially maximum possible reaction of available oxygen with char fuel within said combustion chamber;

each char burning engine, whatever the number of engine cylinders, being equipped with at least one reload mechanism, and each cylinder of said engine being served by at least one reload mechanism;

wherein said ash removal mechanism is moveable and ashes are removed in the molten state;

and further comprising;

means for unsealing the gas leakage sealing means at the ash removal end of said combustion chamber when the engine is about to be stopped so that ashes can be blown down out of said combustion chamber before the engine has stopped.

16. A char burning engine as described in claim 14;

wherein said reload mechanism comprises a fuel charging mechanism, an air density sensor and control, and an ash level sensor and control;

said fuel charging mechanism comprising; means for transferring at intervals a set quantity of fresh char fuel from a fuel supply hopper into said refuel mechanism, setting the quantity of fresh car fuel so tranferred, and processing the transferred fresh char fuel quantity;

said air density sensor and control comprising; means for sensing the engine intake air density and adjusting said quantity setting device of said fuel charging mechanism so that the quantity of fresh char fuel transferred at each reloading into said refuel mechanism is proportional to the density of the engine intake air;

said ash level sensor and control comprising; means for sensing the ash zone level within said combustion chamber and adjusting said quantity setting device of said fuel charging mechanism so that the ash zone level within said combustion chamber is deep enough within said combustion chamber to assure essentially maximum possible reaction of char fuel while within said combustion chamber and is low enough within said combustion chamber to assure essentially maximum possible reaction of available oxygen with char fuel within said combustion chamber;

each char burning engine, whatever the number of engine cylinders, being equipped with at least one reload mechanism, and each cylinder of said engine being served by at least one reload mechanism;

wherein said ash removal occurs at intervals which are a fixed integral multiple of the refuel interval.

17. A char burning engine as described in claim 14;

wherein said reload mechanism comprises a fuel charging mechanism, an air density sensor and control, and an ash level sensor and control;

said fuel charging mechanism comprising; means for transferring at intervals a set quantity of fresh char fuel from a fuel supply hopper into said refuel mechanism, setting the quantity of fresh char fuel so transferred, and processing the transferred fresh char fuel quantity;

said air density sensor and control comprising; means for sensing the engine intake air density and adjusting said quantity setting device of said fuel charging mechanism so that the quantity of fresh char fuel transferred at each reloading into said refuel mechanism is proportional to the density of the engine intake air;

said ash level sensor and control comprising; means for sensing the ash zone level within said combustion chamber and adjusting said quantity setting device of said fuel charging mechanism so that the ash zone level within said combustion chamber is deep enough within said combustion chamber to assure essentially maximum possible reaction of char fuel while within said combustion chamber and is low enough within said combustion chamber to assure essentially maximum possible reaction of available oxygen with char fuel within said combustion chamber;

each char burning engine, whatever the number of engine cylinders, being equipped with at least one reload mechanism, and each cylinder of said engine being served by at least one reload mechanism;

wherein said ash removal occurs at intervals;

and further comprising:

means for setting said interval of ash removal to be whenever a certain quantity of ashes has accumulated within said ash removal mechanism.

18. A char burning engine comprising:

an internal combustion engine mechanism comprising at least one cylinder with pistons operative therein;

a combustion chamber comprising; means for containing char fuel and ashes so that said char fuel and ashes are mechanically separated from the piston and cylinder of the engine, said means for containing having a refuel and an ash removal end, with passages through said means for containing char fuel and ashes so that air can flow readily into said char fuel during engine compression and so that gases can flow readily out of said char fuel during engine expansion, whereby combustion of said char fuel can occur within said means for containing char fuel and ashes, each cylinder of said internal combustion engine being equipped with at least one of said combustion chambers;

a refuel mechanism comprising a refuel block and a refuel block drive;

said refuel block comprising; means for adding fresh char fuel into said combustion chamber at intervals, said means for adding fresh char fuel displacing a fixed volume at each refueling; and means for sealing the refuel end of said combustion chamber;

said refuel block drive comprising; means for driving said refuel block through a refuel cycle at the end of each refuel interval, so that the refuel end of the combustion chamber is sealed during engine compression and expansion processes;

a refuel interval setter comprising a revolutions counter and refuel initiator, an air density sensor and control and an ash level sensor and control;

said revolutions counter and refuel initiator comprising; means for counting engine revolutions up to the refuel interval set by said controls and then initiating the refuel mechanism and resetting itself to start counting the next refuel interval;

said air density sensor and control comprising: means for sensing the engine intake air density and setting said refuel interval of engine revolutions so that said refuel interval is inversely proportional to the density of the engine intake air;

said ash level sensor and control comprising; means for sensing the ash zone level within said combustion chamber and adjusting said refuel interval of engine revolutions so that the ash zone level within said combustion chamber is deep enough within said combustion chamber to assure essentially maximum possible reaction of char fuel while within said combustion chamber, and is low enough within said combustion chamber to assure essentially maximum possible reaction of available oxygen with char fuel within said combustion chamber;

each char burning engine, whatever the number of engine cylinders, being equipped with at least one refuel interval setter and each cylinder of said engine being served by at least one refuel interval setter;

means for reloading a quantity of fresh char fuel at intervals into said refuel mechanism, said means for reloading a quantity of fresh char fuel being a reload mechanism, each char burning engine, whatever the number of engine cylinders, being equipped with at least one reload mechanism, and each cylinder of said engine being served by at least one reload mechanism;

an ash removal mechanism comprising; means for removing a quantity of ashes from said combustion chamber; means for dumping said removed quantity of ashes outside the engine; means for sealing the ash removal end of said combustion chamber against gas leakage during compression and expansion processes of the engine;

means for heating a portion of the char fuel within said combustion chamber to that temperature at which char will react rapidly with oxygen in adjacent compressed air, so that the engine will start when cranked;

means for slowing down the reaction of char and oxygen when the engine is to be stopped;

means for controlling the density of the engine intake air in order to control engine torque;

whereby said internal combustion engine becomes a char burning engine capable of running on char fuels as well as on fuels used for said starting means.

19. A char burning engine as described in claim 18;
wherein said ash removal mechanism is moveable and ashes are removed in the molten state;
and further comprising:
means for unsealing the gas leakage sealing means at the ash removal end of said combustion chamber when the engine is about to be stopped so that ashes can be blown down out of said combustion chamber before the engine has stopped.

20. A char burning engine as described in claim 18;
wherein said ash removal occurs at intervals which are a fixed integral number of engine revolutions.

21. A char burning engine as described in claim 18;
wheren said ash removal occurs at intervals;
and further comprising:
means for setting said interval of ash removal to be whenever a certain quantity of ashes has accumulated within said ash removal mechanism.

22. A char burning engine as described in claim 18;
wherein said ash removal occurs at intervals equal to the refuel interval and with ashes being removed from said combustion chamber at the same time as fresh clear fuel is being refueled into said combustion chamber and further with ash removal mechanism displacement being equal to refuel mechanism displacement.

23. A char burning engine comprising:
an internal combustion engine mechanism comprising at least one cylinder with pistons operative therein;
at least two combustion chambers for each cylinder of said engine, each such combustion chamber comprising;
means for containing char fuel and ashes so that said char fuel and ashes are mechanically separated from the piston and cylinder of the engine, with passages through said means for containing char fuel and ashes, so that air can flow readily into said char fuel when said means for containing is subjected to compression inside the engine cylinder, and so that gases can flow readily out of said char fuel when said means for containing is subjected to expansion inside the engine cylinder;
at least one moveable chamber block for each cylinder of said engine, with said combustion chambers being mounted into said moveable chamber block so that at at least one position within the range of motion of said moveable chamber block each combustion chamber is positioned inside the engine cylinder, and so that at at least one other position within the range of motion of said moveable chamber block each combustion chamber is positioned outside the engine cylinder;
means for sealing between the cylinder of said engine and said moveable chamber block during engine compression and expansion processes;
means for adding fresh char fuel into each combustion chamber when it is positioned outside the engine cylinder and is stopped, said means for adding being a refuel mechanism, each engine being equipped with at least one refuel mechanism, each combustion chamber being refueled by at least one refuel mechanism;

means for reloading a quantity of fresh char fuel into said refuel mechanism after each combustion chamber is refueled, each engine being equipped with at least one reload mechanism, each refuel mechanism being served by at least one reload mechanism;

drive means for moving said moveable chamber block so that whenever said moveable chamber block motion is stopped, at least one combustion chamber is positioned inside the engine cylinder, and at least one combustion chamber is positioned outside the engine cylinder, said moveable chamber block motion occurring at intervals of an integral number of engine crankshaft revolutions;

means for controlling the density of the engine intake air in order to control engine torque;

whereby said internal combustion engine becomes a char burning engine capable of running on char fuels.

24. A char burning engine as described in claim 23; and further comprising:

means for removing a quantity of ashes from each combustion chamber when it is positioned outside the engine cylinder and is stopped, said means for removing being an ash removal mechanism;

means for dumping said removed quantity of ashes outside the engine;

each engine being equipped with at least one ash removal mechanism;

each combustion chamber having its ashes removed by at least one ash removal mechanism.

25. A char burning engine as described in claim 11, 14, 18, 23, or 24; wherein said char burning engine is a unit process engine.

26. A char burning engine as described in claim 11, 14, 18, 23, or 24; wherein said char burning engine is a dual process engine.

27. A char burning engine as described in claim 11, 14, 18, 23, or 24; wherein said char burning engine is a partial dual process engine.

28. A char burning engine as described in claim 11, 14, 18, 23, or 24;
and further comprising:
means for adjusting the proportion of engine intake air forced inside the pores of the char fuel, while the engine is running;
whereby said char burning engine becomes an adjustable dual process char burning engine.

29. A char burning engine as described in claim 11, 14, 18, 23, or 24; and further comprising:
means for adjusting the proportion of engine intake air forced inside the pores of the char fuel, while the engine is running, by adjusting the geometry of the fresh char fuel being refueled;
whereby said char burning engine becomes an adjustable dual process char burning engine.

30. A char burning engine as described in claim 11, 14, 18, 23, or 24; and further comprising;
means for adjusting the proportion of engine intake air forced inside the pores of the char fuel, while the engine is running, by adjusting the size of the engine clearance volume not occupied by the char fuel;
whereby said char burning engine becomes an adjustable dual process char burning engine.

31. A char burning engine as described in claim 1, 2, 3, 11, 14, 18, 23, or 24;
and further comprising:
means for pouring a quantity of oil fuel on to said fresh char fuel, prior to the early portions of that engine compression stroke next following said adding of said fresh char fuel into said combustion chamber;
whereby said internal combustion engine becomes a char burning engine capable of running also on oil fuels.

32. A char burning engine as described in claim 1, 2, 3, 11, 14, 18, 23, or 24;
and further comprising:
means for pouring a quantity of oil fuel onto said fresh char fuel, prior to the early portions of that engine compression stroke next following said adding of said fresh char fuel into said combustion chamber;
means for controlling said quantity of oil fuel poured onto said fresh char fuel in proportion to engine intake air density;
whereby said internal combustion engine becomes a char burning engine capable of running also on oil fuels.

33. A char burning engine as described in claim 5, 11, 14, 23, or 24;
wherein said refuel mechanism displaces a fixed volume at each refueling;
wherein said means for removing a quantity of ashes from said combustion chamber does so at intervals and displaces a fixed volume at each ash removal;
said first displacement volume of ash removal being essentially equal to said fixed displacement volume of refueling;
wherein said refueling and said removal of ashes occur at the same time;
and further comprising:
means for placing a quantity of oil fuel on material about to be place into said combustion chamber by said refuel mechanism prior to the early portions of that engine compression stroke next following said placement of said material into said combustion chamber;
means for controlling said quantity of oil fuel in proportion to engine intake air density;
means for recycling unburned portions of said material from said ash removal mechanism back into said means for reloading said refuel mechanism so that said unburned portions are again placed into said combustion chamber by said refuel mechanism;
whereby said internal combustion engine becomes a char burning engine capable of running on oil fuels.

34. A char burning engine as described in claim 5, 11, 14, 23, or 24;
wherein said refuel mechanism displaces a fixed volume at each refueling;
wherein said means for removing a quantity of ashes from said combustion chamber does so at intervals and displaces a fixed volume at each ash removal;
said fixed displacement volume of ash removal being essentially equal to said fixed displacement volume of refueling;
wherein said refueling and said removal of ashes occur at the same time;

wherein said interval of refueling is equal to said interval of ash removal and both intervals are a fixed integral number of engine revolutions;

and further comprising;

means for placing a quantity of oil fuel on material about to be placed into said combustion chamber by said refuel mechanism prior to the early portions of that engine compression stroke next following said placement of said material into said combustion chamber;

means for controlling said quantity of oil fuel in proportion to engine intake air density;

means for recycling unburned portions of said material from said ash removal mechanism back into said means for reloading said refuel mechanism so that said unburned portions are again placed into said combustion chamber by said refuel mechanism;

whereby said internal combustion engine becomes a char burning engine capable of running on oil fuels.

35. A char burning engine a described in claim 1, 2, 3, 11, 14, 18, 23, or 24; and further comprising: means for supplying steam;

means for admitting said steam into each engine cylinder of said char burning engine;

means for controlling the quantity of steam admitted per cycle to be proportional to the air quantity within the cylinder.

36. A char burning engine as described in claim 1, 2, 3, 11, 14, 18, 23 or 24; and further comprising:

means for supplying steam;

means for delivering said steam equally into each engine cylinder commencing after commencement of the engine compression process, and stopping prior to the end of the engine compression process;

means for timing and positioning said steam delivery so that it occurs largely into that engine intake air means which goes into the solid carbon pore spaces within the engine combustion chamber space;

means for controlling said delivered steam quantity to be approximately proportional to that engine intake air quantity which goes into the solid carbon pore spaces.

37. A char burning engine as described in claim 23 or 24;

wherein said integral number of engine revolutions of said interval between moveable chamber block motions is fixed.

38. A char burning engine as described in claim 23 or 24:

wherein said integral number of engine revolutions of said interval between moveable chamber block motions is adjustable;

and further comprising:

an ash level sensor and control comprising;

means for sensing the char fuel volume within each engine cylinder, and means for adjusting the moveable chamber block motion interval of engine revolutions, so that the char volume within each engine cylinder is small enough to assure essentially maximum possible reaction of char fuel while within a combustion chamber, and is large enough to assure essentially maximum possible reaction of available oxygen with char fuel within said combustion chamber.

39. A char burner engine as described in claim 1, 2, 3, 11, 14, 18, 23, or 24, and further comprising:

means for admitting high purity oxygen gas into the engine cylinder during each engine compression process.

40. A char burning engine as described in claim 1, 2, 3, 11, 14, 18, 23, or 24, and further comprising:

means for admitting high purity oxygen gas into the engine cylinder, said oxygen admission being timed to commence no earlier than the start of each engine air intake process and to cease no later than the end of each next following engine compression process.

41. A char burning engine comprising:

an internal combustion engine comprising at least one cylinder with piston operative therein;

at least two combustion chambers for each cylinder of said engine, each such combustion chamber comprising;

means for containing char fuel and ashes so that said char fuel and ashes are mechanically separated from the piston and cylinder of the engine, with passages through said means for containing char fuel and ashes, so that air can flow readily into said char fuel when said means for containing is subjected to compression inside the engine cylinder, and so that gases can flow readily out of said char fuel when said means for containing is subjected to expansion inside the engine cylinder;

at least one moveable chamber block for each cylinder of said engine, with said combustion chambers being mounted into said moveable chamber block so that at at least one position within the range of motion of said moveable chamber block each combustion chamber is positioned inside the engine cylinder, and so that at at least one other position within the range of motion of said moveable chamber block each combustion chamber is positioned outside the engine cylinder;

means for sealing between the cylinder of said engine and said moveable chamber block during engine compression and expansion processes;

means for adding fresh car fuel into each combustion chamber when it is positioned outside the engine cylinder and is stopped, said means for adding being a refuel mechanism, each engine being equipped with at least one refuel mechanism, each combustion chamber being refueled by at least one refuel mechanism;

means for reloading a quantity of fresh char fuel into said refuel mechanism after each combustion chamber is refueled, each engine being equipped with at least one reload mechanism, each refuel mechanism being served by at least one reload mechanism;

drive means for moving said moveable chamber block so that said moveable chamber block motion occurs only during engine exhaust and intake, and so that whenever said moveable chamber block motion is stopped at least one combustion chamber is positioned inside the engine cylinder, and at least one combustion chamber is positioned outside the engine cylinder, said moveable chamber block motion occurring at intervals of an integral number of engine crankshaft revolutions;

means for controlling the density of the engine intake air in order to control engine torque;

whereby said internal combustion engine becomes a char burning engine capable of running on char fuels.

42. A char burning engine as described in claim 41; and further comprising:
- means for removing a quantity of ashes from each combustion chamber when it is positioned outside the engine cylinder and is stopped, said means for removing being an ash removal mechanism;
- means for dumping said removed quantity of ashes outside the engine;
- each engine being equipped with at least one ash removal mechanism;
- each combustion chamber having its ashes removed by at least one ash removal mechanism.

43. A char burning engine as described in claim 41 or 42;
- wherein said integral number of engine revolutions of said interval between moveable chamber block motions is fixed.

44. A char burning engine as described in claim 41 or 42;
- wherein said integral number of engine revolutions of said interval between moveable chamber block motions is adjustable;

and further comprising:
- an ash level sensor and control comprising;
- means for sensing the char fuel volume within each engine cylinder, and means for adjusting the moveable chamber block motion interval of engine revolutions, so that the char volume within each engine cylinder is small enough to assure essentially maximum possible reaction of char fuel while within a combustion chamber, and is large enough to assure essentially maximum possible reaction of available oxygen with char fuel within said combustion chamber.

* * * * *

UNITED STATES PATENT AND TRADEMARK OFFICE
CERTIFICATE OF CORRECTION

PATENT NO. : 4,412,511

DATED : November 1, 1983

INVENTOR(S) : Joseph C. Firey

It is certified that error appears in the above-identified patent and that said Letters Patent is hereby corrected as shown below:

Col. 2 line 11: add -- engine -- between, combustion and "is
Col. 9 line 24: change "portions" to -- positions --
Col. 15 line 39: change "cylindlical" to -- cylindrical --
Col. 19 line 11: change "aviod" to -- avoid --

Col. 24 line 21: change "contrl" to -- control --
Col. 28 line 19: change "or" to -- of --

Col. 35 line 51: change "requied" to -- required --
Col. 37 line 27: change "Combustion" to -- Combinations --
Col. 37 line 46: change "handle, 175" to -- handle, 176 --
Col. 39 line 20: change "refeul" to - refuel --
Col. 43 line 13: change "that combustion" to -- that said combustion --
Col. 48 line 32: change "clear" to -- char --
Col. 50 line 34: change "first" to -- fixed --
Col. 50 line 41: change "place" to -- placed --
Col. 52 line 41: change "car" to -- char --

Signed and Sealed this

Sixteenth Day of October 1984

[SEAL]

Attest:

GERALD J. MOSSINGHOFF

Attesting Officer

Commissioner of Patents and Trademarks